(12) United States Patent     (10) Patent No.:   US 12,610,400 B2

Liu et al.     (45) Date of Patent:     Apr. 21, 2026

(54) BANDWIDTH CONFIGURATION METHOD, TRANSMISSION METHOD, COMMUNICATION NODE, AND STORAGE MEDIUM

(71) Applicant: ZTE CORPORATION, Shenzhen (CN)

(72) Inventors: Kun Liu, Shenzhen (CN); Bo Dai, Shenzhen (CN); Huiying Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 319 days.

(21) Appl. No.: 18/479,255

(22) Filed: Oct. 2, 2023

(65) Prior Publication Data

US 2024/0032112 A1     Jan. 25, 2024

Related U.S. Application Data

(63) Continuation of application No. PCT/CN2022/078166, filed on Feb. 28, 2022.

(51) Int. Cl.
    *H04W 74/0833*     (2024.01)
    *H04L 5/00*     (2006.01)
    (Continued)

(52) U.S. Cl.
    CPC ....... *H04W 74/0833* (2013.01); *H04L 5/0046* (2013.01); *H04W 72/0453* (2013.01); *H04W 72/1268* (2013.01)

(58) Field of Classification Search
    CPC ......... H04W 74/0833; H04W 72/0453; H04W 72/1268; H04W 74/004; H04W 72/0457;
    (Continued)

(56) References Cited

U.S. PATENT DOCUMENTS

| | | | |
|---|---|---|---|
| 2023/0164669 A1 | 5/2023 | Liu | |
| 2023/0292322 A1* | 9/2023 | Kim | ...................... H04W 72/21 |
| 2023/0292364 A1* | 9/2023 | Mu | ................... H04W 74/0891 |

FOREIGN PATENT DOCUMENTS

| | | |
|---|---|---|
| CN | 110474744 A | 11/2019 |
| CN | 111567126 A | 8/2020 |

(Continued)

OTHER PUBLICATIONS

Extended European Search Report in Application No. 22778430.3, dated Mar. 4, 2025, 10 pages.

(Continued)

*Primary Examiner* — Thai Nguyen

(74) *Attorney, Agent, or Firm* — Morgan, Lewis & Bockius LLP

(57) ABSTRACT

Provided are a bandwidth configuration method, a transmission method, a communication node, and a storage medium. The bandwidth configuration method includes: determining a first initial uplink bandwidth part, where the first initial uplink bandwidth part includes a random access channel resource, the random access channel resource includes at least one random access channel occasion, and the at least one random access channel occasion is used for transmitting a random access preamble; and configuring a second initial uplink bandwidth part for a first type of user equipment (UE), where a bandwidth of the second initial uplink bandwidth part is smaller than a bandwidth of the first initial uplink bandwidth part.

19 Claims, 11 Drawing Sheets

(51) Int. Cl.
*H04W 72/0453*       (2023.01)
*H04W 72/1268*       (2023.01)

(58) Field of Classification Search
CPC ... H04L 5/0046; H04L 5/0023; H04L 5/0048;
H04L 5/008; H04L 5/0092; H04L
27/26025
See application file for complete search history.

(56) References Cited

FOREIGN PATENT DOCUMENTS

| EP | 3993540 A1 * | 5/2022 | ........ H04W 74/0833 |
| WO | WO2020165487 A1 | 8/2020 | |
| WO | 2021022123 A1 | 2/2021 | |
| WO | WO2021230701 A1 | 11/2021 | |

OTHER PUBLICATIONS

International Search Report in Application No. PCT/CN2022/078166, dated May 13, 2022, 4 pages, including translation.
LG Electronics Inc. "Discussion on Complexity Reduction of Reduced Capability NR Devices", 3GPP TSG_RAN WG1 Meeting #104e, R1-2100900, Jan. 18, 2021, 7 pages.

* cited by examiner

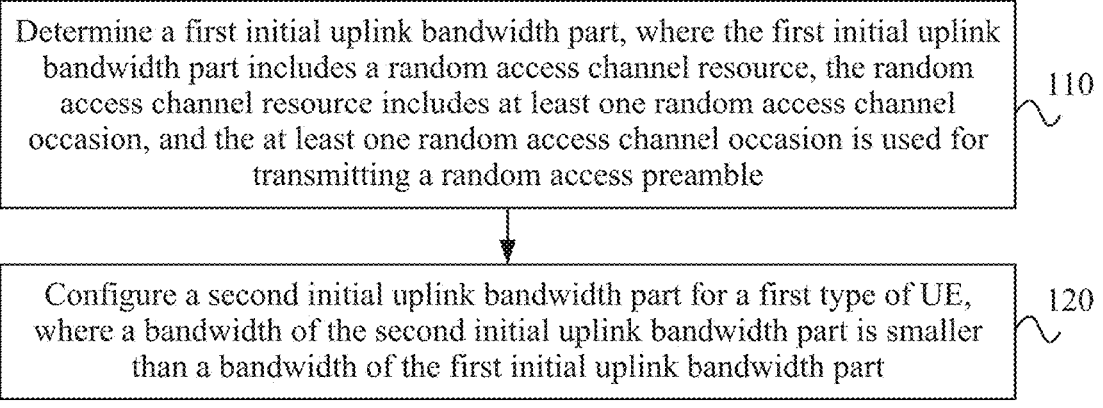

Determine a first initial uplink bandwidth part, where the first initial uplink bandwidth part includes a random access channel resource, the random access channel resource includes at least one random access channel occasion, and the at least one random access channel occasion is used for transmitting a random access preamble — 110

Configure a second initial uplink bandwidth part for a first type of UE, where a bandwidth of the second initial uplink bandwidth part is smaller than a bandwidth of the first initial uplink bandwidth part — 120

FIG. 1

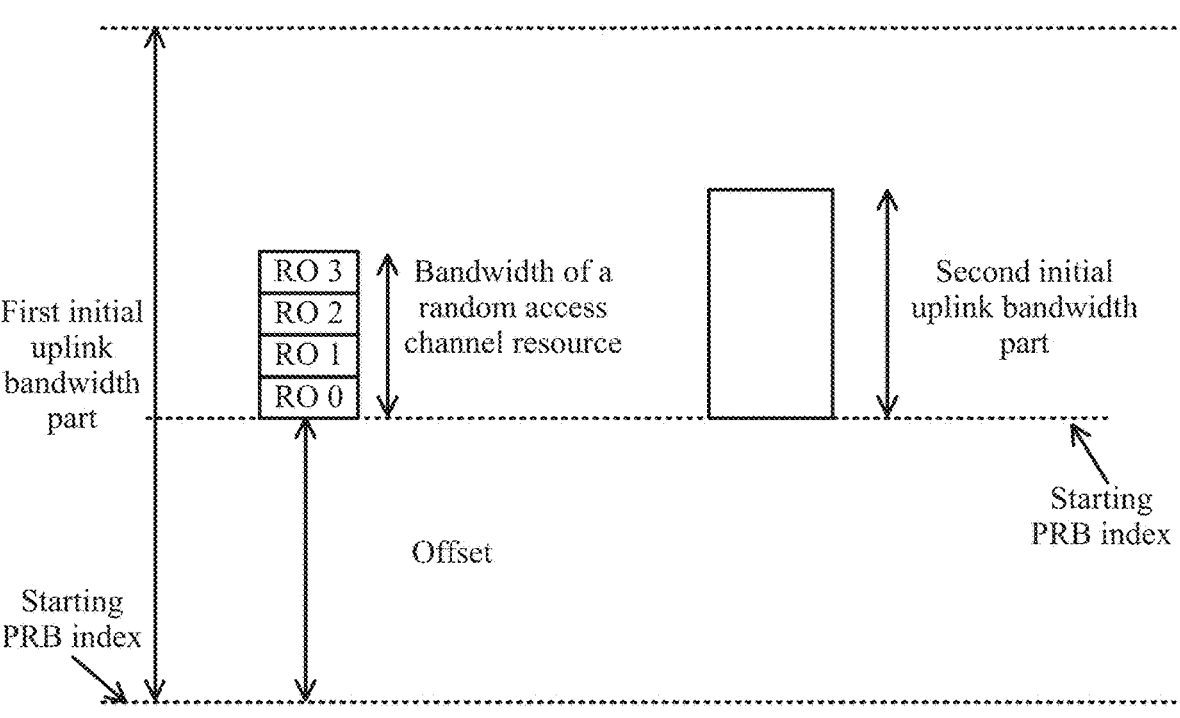

FIG. 2

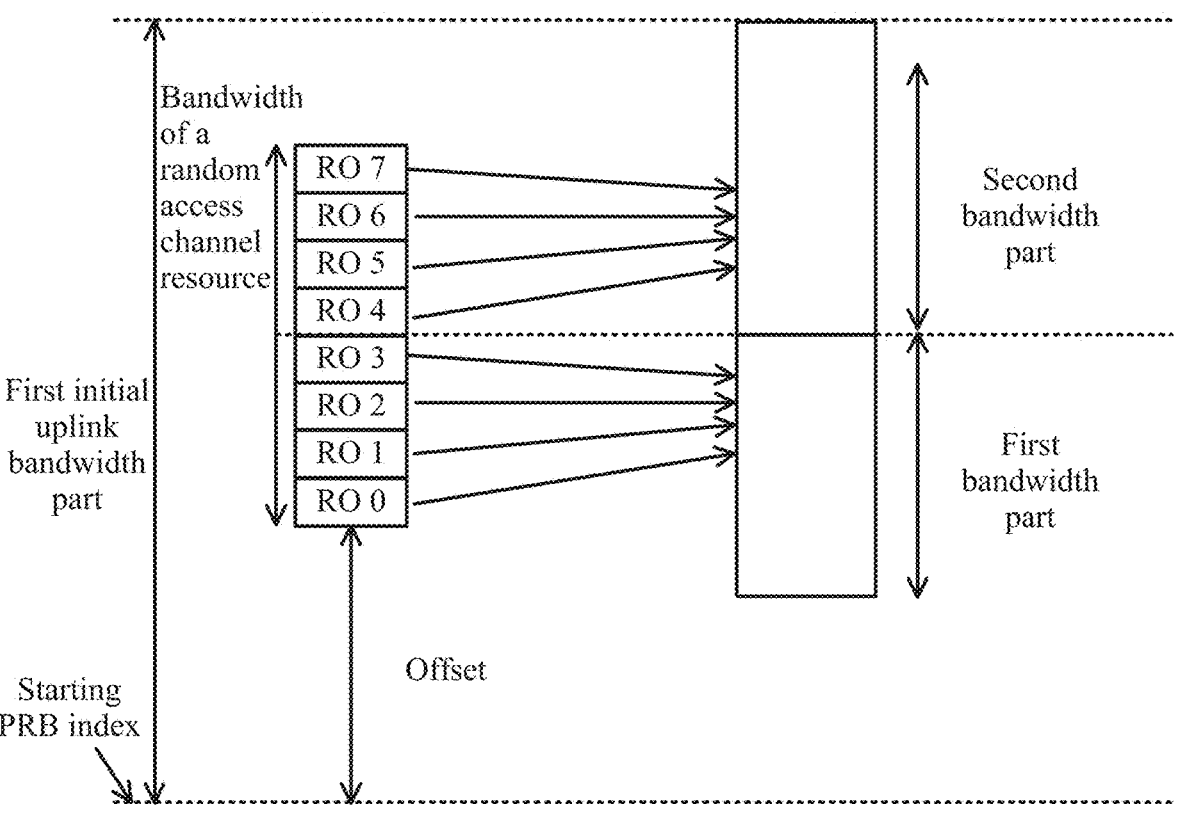

FIG. 11

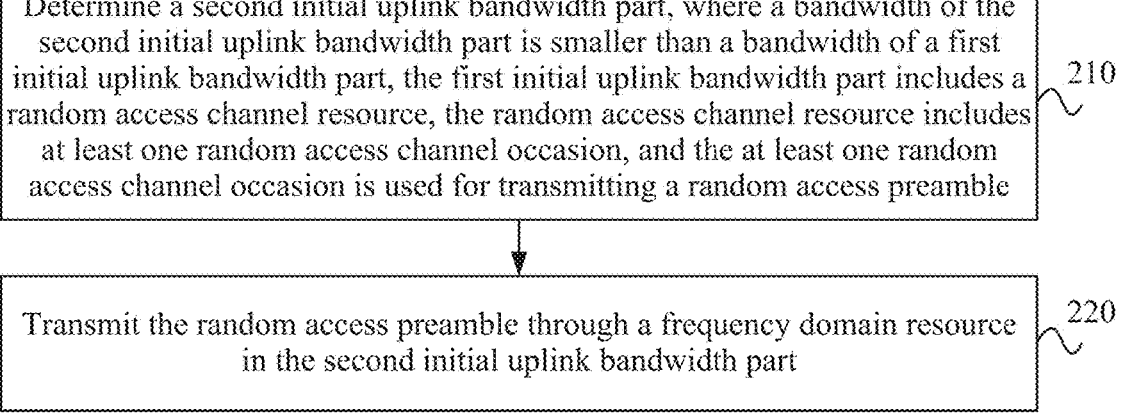

Determine a second initial uplink bandwidth part, where a bandwidth of the second initial uplink bandwidth part is smaller than a bandwidth of a first initial uplink bandwidth part, the first initial uplink bandwidth part includes a random access channel resource, the random access channel resource includes at least one random access channel occasion, and the at least one random access channel occasion is used for transmitting a random access preamble ⟩ 210

Transmit the random access preamble through a frequency domain resource in the second initial uplink bandwidth part ⟩ 220

FIG. 12

BANDWIDTH CONFIGURATION METHOD, TRANSMISSION METHOD, COMMUNICATION NODE, AND STORAGE MEDIUM

This application is a continuation of International Patent Application No. PCT/CN2022/078166, filed on Feb. 28, 2022, which claims priority to Chinese Patent Application No. 202110363332.6 filed on Apr. 2, 2021, disclosures of both of which are incorporated herein by reference in their entireties.

TECHNICAL FIELD

The present application relates to the field of wireless communication networks, for example, a bandwidth configuration method, a transmission method, a communication node, and a storage medium.

BACKGROUND

A user equipment (UE) has a strong capability or a weak capability. For example, a user equipment applied to a New Radio (NR) system, that is, a New Radio User Equipment (NR UE), generally has relatively high performance, while a user equipment having a simplified function, that is, a reduced capability user equipment (RedCap UE), can satisfy requirements in application scenarios such as a wearable device, video surveillance, and industrial wireless sensors. Compared with the NR UE, the RedCap UE has a weaker capability and supports a smaller bandwidth and a smaller number of antennas.

In the NR system, the UE receives a synchronization signal/physical broadcast channel block (SSB) in an initial access procedure, where the SSB includes a primary synchronization signal (PSS), a secondary synchronization signal (SSS), and a physical broadcast channel (PBCH). A master information block (MIB) carried in the PBCH includes configuration information of a control resource set zero (CORESET0). The CORESET0 includes at least one resource for sending a physical downlink control channel (PDCCH), where the PDCCH is used for carrying scheduling information of a system information block 1 (SIB1). The UE decodes the MIB to acquire the configuration information of the CORESET0 and then decodes the PDCCH in the CORESET0 to acquire the scheduling information of the SIB1, where the SIB1 includes configuration information of an initial uplink bandwidth part (UL BWP) configured by a network side for the UE. In the case where the initial UL BWP exceeds a maximum operating bandwidth of the RedCap UE, the RedCap UE cannot operate normally or send a random access preamble by using a frequency domain resource of the initial UL BWP, affecting the reliability of the initial access procedure.

SUMMARY

The present application provides a bandwidth configuration method, a transmission method, a communication node, and a storage medium, so as to configure an initial uplink bandwidth part with a relatively small bandwidth for a first type of UE and improve the reliability of an initial access procedure.

An embodiment of the present application provides a bandwidth configuration method. The method includes: determining a first initial uplink bandwidth part, where the first initial uplink bandwidth part includes a random access channel resource, the random access channel resource includes at least one random access channel occasion, and the at least one random access channel occasion is used for transmitting a random access preamble; and configuring a second initial uplink bandwidth part for a first type of UE, where a bandwidth of the second initial uplink bandwidth part is smaller than a bandwidth of the first initial uplink bandwidth part.

An embodiment of the present application further provides a transmission method. The method includes: determining a second initial uplink bandwidth part, where a bandwidth of the second initial uplink bandwidth part is smaller than a bandwidth of a first initial uplink bandwidth part, the first initial uplink bandwidth part includes a random access channel resource, the random access channel resource includes at least one random access channel occasion, and the at least one random access channel occasion is used for transmitting a random access preamble; and transmitting the random access preamble through a frequency domain resource in the second initial uplink bandwidth part.

An embodiment of the present application further provides a communication node. The communication node includes a memory, a processor, and a computer program stored on the memory and executable by the processor, where the processor executes the computer program to perform the preceding bandwidth configuration method or the preceding transmission method.

An embodiment of the present application further provides a non-transitory computer-readable storage medium. The non-transitory computer-readable storage medium stores a computer program which, when executed by a processor, causes the processor to perform the preceding bandwidth configuration method or the preceding transmission method.

BRIEF DESCRIPTION OF DRAWINGS

FIG. 1 is a flowchart of a bandwidth configuration method according to an embodiment.

FIG. 2 is a schematic diagram of a first initial uplink bandwidth part and a second initial uplink bandwidth part according to an embodiment.

FIG. 11 is a schematic diagram of a second bandwidth part and a first initial uplink bandwidth part having the same ending physical resource block according to an embodiment.

FIG. 12 is a flowchart of a transmission method according to an embodiment.

DETAILED DESCRIPTION

Figure 3:
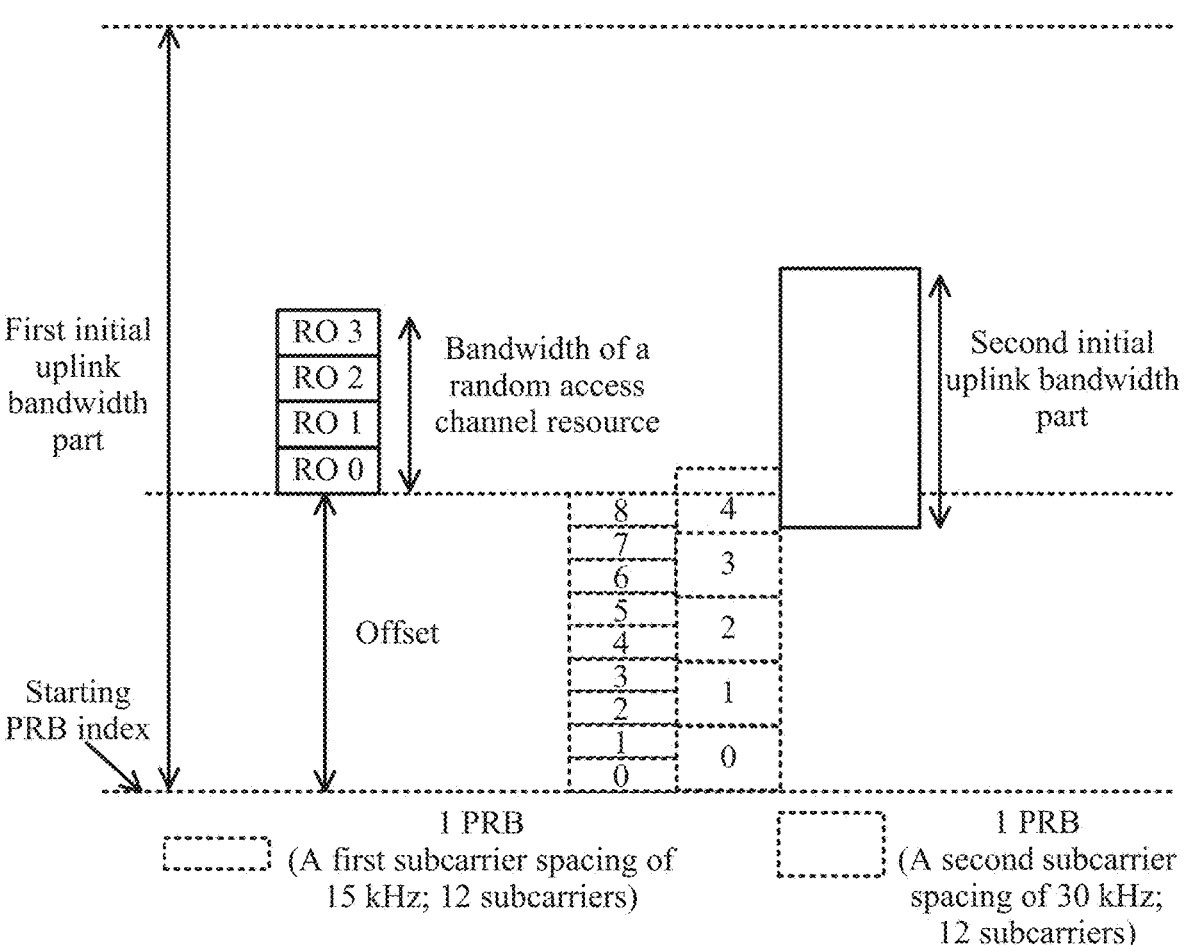
FIG. 3 is a schematic diagram of a starting physical resource block of a second initial uplink bandwidth part according to an embodiment.

The present application is described hereinafter in conjunction with the drawings and embodiments. The embodiments described herein are intended to explain the present application. For ease of description, the drawings illustrate only part related to the present application.

An SSB carries a downlink synchronization signal (including a PSS and an SSS) and a PBCH, where the PBCH carries MIB information. The SSB supports sending in multiple beam directions, that is, sending multiple SSBs in a time division manner is supported.

A random access channel occasion (RO) refers to a time-frequency resource for sending a preamble of a physical random access channel (PRACH). At the same time, multiple random access channel occasions may be included in frequency domain, and the frequency-division multiplexing of at most eight ROs is supported. Additionally, the RO supports periodic sending in time domain.

In a random access procedure, a correspondence exists between the RO and the SSB, that is, one RO may correspond to one SSB or may correspond to multiple SSBs, which may be configured by a network side. For example, a value of N is indicated by a higher-layer parameter, indicating that N SSBs correspond to one RO. For a contention-based random access procedure, the value of N and a value of R may be indicated by the higher-layer parameter, indicating that N SSBs correspond to one RO and each SSB corresponds to R preambles. In a sending period of the SSB, a mapping relationship may be formed between the SSB and the RO in the frequency domain and then in the time domain as indicated by a configuration of the number of SSBs, a time-frequency resource configuration of the PRACH, and parameters N and R.

FIG. 1 is a flowchart of a bandwidth configuration method according to an embodiment. The method may be applied by a network side.

As shown in FIG. 1, the bandwidth configuration method provided in this embodiment includes steps 110 and 120.

In step 110, a first initial uplink bandwidth part is determined, where the first initial uplink bandwidth part includes a random access channel resource, the random access channel resource includes at least one random access channel occasion, and the at least one random access channel occasion is used for transmitting a random access preamble.

In step 120, a second initial uplink bandwidth part is configured for a first type of UE, where a bandwidth of the second initial uplink bandwidth part is smaller than a bandwidth of the first initial uplink bandwidth part.

In this embodiment, the first type of UE refers to a RedCap UE with a relatively weak capability, and a second type of UE refers to an NR UE with a relatively strong capability. The first initial uplink bandwidth part (simply referred to as the first initial UL BWP) is a default initial uplink bandwidth part configured by the network side and is mainly configured for the second type of UE. A frequency domain bandwidth occupied by the first initial UL BWP exceeds a maximum operating bandwidth of the first type of UE. An index of a starting PRB of the first initial UL BWP and a corresponding subcarrier spacing (SCS) may be configured by the network side. A position of a starting position of RO relative to the starting PRB of the first initial UL BWP is represented by an offset.

The bandwidth of the second initial uplink bandwidth part (which is simply referred to as the second initial UL BWP and may also be understood as an initial UL BWP of the RedCap UE) is configured based on the first initial UL BWP, and the bandwidth of the second initial UL BWP is smaller than the bandwidth of the first initial UL BWP.

FIG. 2 is a schematic diagram of a first initial uplink bandwidth part and a second initial uplink bandwidth part according to an embodiment. As shown in FIG. 2, the first initial UL BWP includes the random access channel resource, the random access channel resource includes multiple ROs (RO 0 to RO 3), and the bandwidth of the second initial UL BWP is smaller than the bandwidth of the first initial UL BWP.

According to the bandwidth configuration method in this embodiment, based on the first initial UL BWP, the second initial UL BWP is configured for the first type of UE, and the bandwidth of the second initial UL BWP is relatively small so that the first type of UE can support sending the random access preamble by using a corresponding random access channel resource in the second initial UL BWP, thereby ensuring the reliability of an initial access procedure.

In an embodiment, the bandwidth of the second initial uplink bandwidth part is configured by the network side; or the bandwidth of the second initial uplink bandwidth part is a maximum bandwidth configuration value corresponding to the first type of UE in an operating frequency band. The first type of UE has two operating frequency bands and the maximum bandwidth configuration value corresponding to the first type of UE in the operating frequency band includes two cases: a maximum bandwidth configuration value corresponding to the first type of UE in a first frequency band (denoted as Frequency Range 1 (FR1)) is 20 MHz; and a maximum bandwidth configuration value corresponding to the first type of UE in a second frequency band (denoted as Frequency Range 2 (FR2)) is 100 MHz.

In an embodiment, the second initial uplink bandwidth part includes the random access channel resource. That is, a frequency domain resource corresponding to the second initial UL BWP includes all frequency domain resources of the at least one random access channel occasion.

In an embodiment, a starting PRB of the second initial uplink bandwidth part is the same as a starting PRB of the random access channel resource. That is, the starting PRB of the second initial UL BWP is a starting PRB of an RO resource configured by the network side, for example, a starting PRB corresponding to RO 0 in FIG. 2.

In an embodiment, the bandwidth of the second initial UL BWP is configured by the network side or is the maximum bandwidth configuration value of the RedCap UE by default. The maximum bandwidth configuration value corresponding to the first type of UE in the FR1 is 20 MHz; and the maximum bandwidth configuration value corresponding to the first type of UE in the FR2 is 100 MHz.

In an embodiment, a physical resource block of the random access channel resource corresponds to a first subcarrier spacing (denoted as SCS1), and a physical resource block of the second initial uplink bandwidth part corresponds to a second subcarrier spacing (denoted as SCS2), where in the case where SCS1 is different from SCS2, the starting PRB of the second initial uplink bandwidth part is a physical resource block including the starting PRB of the random access channel resource and having SCS2.

In this embodiment, in the case where the SCS corresponding to the offset indicating the starting PRB of the RO is different from the SCS of the second initial uplink bandwidth part, the starting PRB of the second initial uplink bandwidth part needs to include the starting PRB of the RO.

In the process of sending the preamble by using the random access channel resource, the preamble occupies multiple subcarriers in the frequency domain, and a subcarrier spacing of for example, 1.25 kHz is specially used for the preamble. The subcarrier spacing here is not the preceding SCS1. Assuming that the preamble occupies 839 subcarriers in the frequency domain and considering that sufficient guard bandwidths are reserved for an upper sideband and a lower sideband of the preamble, a total bandwidth occupied by sending the preamble is assumed to be A, and A may be measured by the PRB, where the subcarrier spacing corresponding to the PRB is the preceding SCS1.

For example, SCS2 is greater than SCS1, thereby ensuring that the starting PRB of the second initial UL BWP can include the starting PRB of the random access channel resource.

FIG. 3 is a schematic diagram of a starting physical resource block of a second initial uplink bandwidth part according to an embodiment. As shown in FIG. 3, the offset is measured by the PRB based on SCS1=15 kHz, where one PRB includes 12 subcarriers. In FIG. 3, Offset PRB=9 (that is, the offset is 9 PRBs). SCS2 used by the second initial UL BWP=30 kHz. As shown in FIG. 3, a dotted rectangular box in the right column represents a PRB with a subcarrier spacing of 30 kHz. On this basis, the starting PRB of the second initial UL BWP is PRB 4 with a subcarrier spacing of 30 kHz so that the starting PRB of the second initial UL BWP includes the starting PRB of the random access channel resource, and the frequency domain resource corresponding to the second initial UL BWP includes all the frequency domain resource of the at least one random access channel occasion.

In an embodiment, in the case where a first condition is satisfied, the starting PRB of the second initial uplink bandwidth part is the same as the starting PRB of the first initial uplink bandwidth part or a starting frequency domain position of the second initial uplink bandwidth part is the same as a starting frequency domain position of the first initial uplink bandwidth part; where the first condition includes at least one of the conditions below.

(1.1) A sum of a bandwidth of the random access channel resource and the offset of the starting PRB of the random access channel resource relative to the starting PRB of the first initial uplink bandwidth part is less than or equal to the maximum bandwidth configuration value corresponding to the first type of UE in the operating frequency band. (1.2) A sum of a bandwidth of the random access channel resource and the offset of the starting PRB of the random access channel resource relative to the starting PRB of the first initial uplink bandwidth part is less than or equal to the bandwidth of the second initial uplink bandwidth part. (1.3) A frequency domain bandwidth between an ending PRB of the random access channel resource and the starting PRB of the first initial uplink bandwidth part is less than or equal to the maximum bandwidth configuration value corresponding to the first type of UE in the operating frequency band. (1.4) A frequency domain bandwidth between an ending PRB of the random access channel resource and the starting PRB of the first initial uplink bandwidth part is less than or equal to the bandwidth of the second initial uplink bandwidth part. The offset of the starting PRB of the random access channel resource relative to the starting PRB of the first initial uplink bandwidth part is indicated by N1 PRBs, where N1 is an integer greater than or equal to 0.

In this embodiment, the second initial UL BWP and the first initial UL BWP have the same starting position. The starting PRB of the random access channel resource refers to a frequency domain resource corresponding to a starting position of PRBs of the random access channel resource. The ending PRB of the random access channel resource refers to a frequency domain resource corresponding to an ending position of the PRBs of the random access channel resource. The starting PRB of the first initial UL BWP refers to a frequency domain resource corresponding to a starting position of PRBs of the first initial UL BWP. An ending PRB of the first initial UL BWP refers to a frequency domain resource corresponding to an ending position of the PRBs of the first initial UL BWP.

For (1.3), whether the frequency domain bandwidth between the ending PRB of the random access channel resource and the starting PRB of the first initial UL BWP is less than or equal to the maximum bandwidth configuration value corresponding to the first type of UE in the operating frequency band may be determined by an index of the ending PRB of the random access channel resource. For example, if the index of the ending PRB of the random access channel resource is less than or equal to A1, it indicates that the frequency domain bandwidth is less than or equal to the maximum bandwidth configuration value corresponding to the first type of UE in the operating frequency band.

For (1.4), whether the frequency domain bandwidth between the ending PRB of the random access channel resource and the starting PRB of the first initial UL BWP is less than or equal to the bandwidth of the second initial uplink bandwidth part may be determined by the index of the ending PRB of the random access channel resource. For example, if the index of the ending PRB of the random access channel resource is less than or equal to A1, it indicates that the frequency domain bandwidth is less than or equal to the bandwidth of the second initial uplink bandwidth part.

Figure 4:
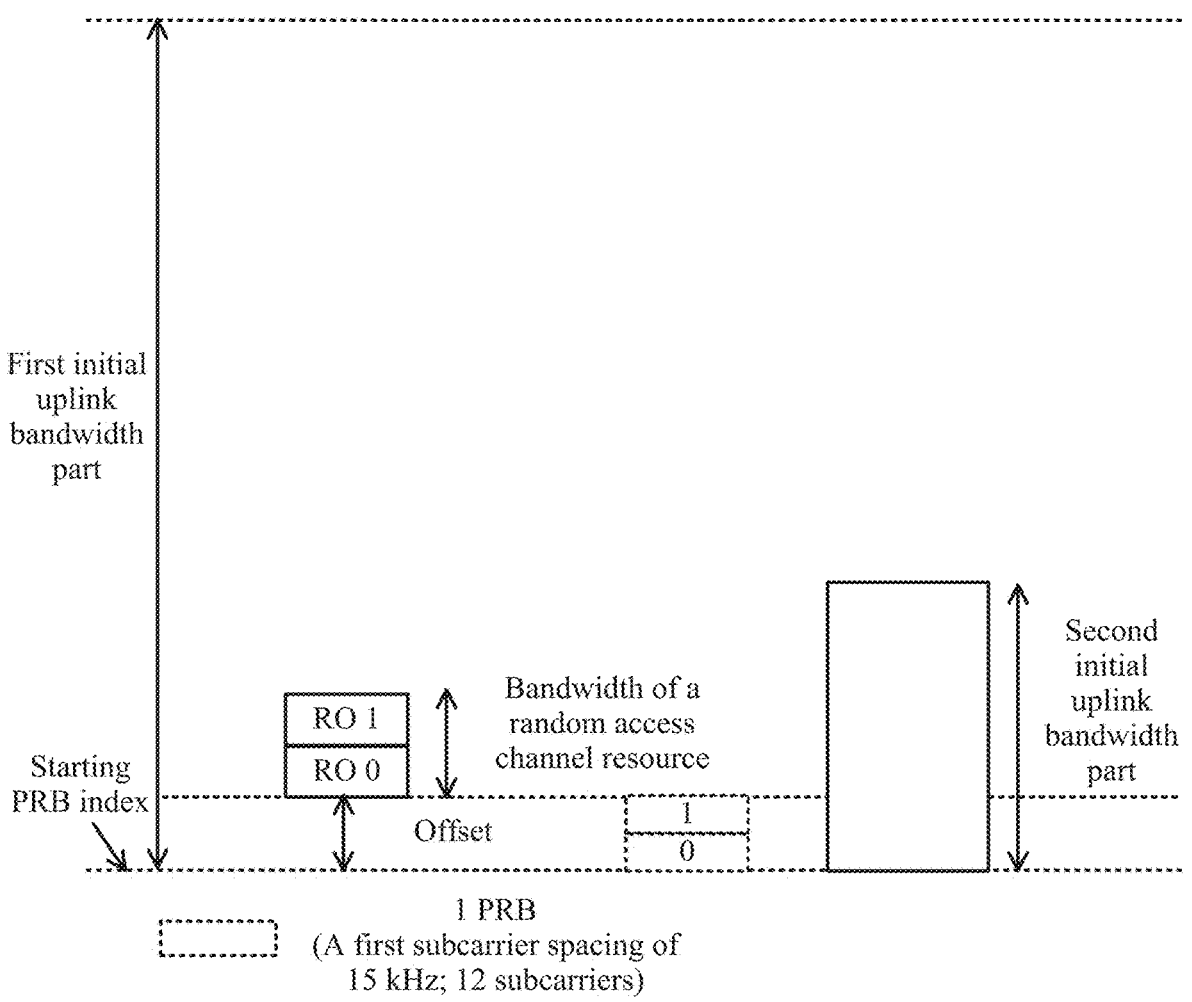
FIG. 4 is a schematic diagram of a first initial uplink bandwidth part and a second initial uplink bandwidth part having the same starting physical resource block according to an embodiment.

FIG. 4 is a schematic diagram of a first initial uplink bandwidth part and a second initial uplink bandwidth part having the same starting physical resource block according to an embodiment. As shown in FIG. 4, Offset PRB is 2. In the case where one or more of the conditions below are satisfied, the starting PRB of the second initial UL BWP is the starting PRB of the first initial UL BWP.

Offset PRB+BW of ROs 20 MHz for FR1 (or 100 MHz for FR2). Offset PRB+BW of ROs the bandwidth of the second initial UL BWP configured by the network side for the RedCap UE. The frequency domain bandwidth between the ending PRB of the random access channel resource and the starting PRB of the first initial UL BWP≤20 MHz for FR1 (or 100 MHz for FR2). The frequency domain bandwidth between the ending PRB of the random access channel resource and the starting PRB of the first initial UL BWP≤the bandwidth of the second initial UL BWP configured by the network side for the RedCap UE. The index of the ending PRB of the random access channel resource≤A1.

BW of ROs denotes the bandwidth of the random access channel resource, Offset PRB denotes the offset of the starting PRB of the random access channel resource relative to the starting PRB of the first initial UL BWP, 20 MHz for FR1 represents that the maximum bandwidth configuration value corresponding to the RedCap UE in the first frequency band is 20 MHz, and 100 MHz for FR2 represents that the maximum bandwidth configuration value corresponding to the RedCap UE in the second frequency band is 100 MHz.

In an embodiment, in the case where a second condition is satisfied, an ending PRB of the second initial uplink bandwidth part is the same as the ending PRB of the first initial uplink bandwidth part or an ending frequency domain position of the second initial uplink bandwidth part is the same as an ending frequency domain position of the first initial uplink bandwidth part; where the second condition includes at least one of the conditions below.

(2.1) A sum of the bandwidth of the random access channel resource and an offset of the ending PRB of the random access channel resource relative to the ending PRB of the first initial uplink bandwidth part is less than or equal to the maximum bandwidth configuration value corresponding to the first type of UE in the operating frequency band. (2.2) A sum of the bandwidth of the random access channel resource and an offset of the ending PRB of the random access channel resource relative to the ending PRB of the first initial uplink bandwidth part is less than or equal to the bandwidth of the second initial uplink bandwidth part. (2.3) A frequency domain bandwidth between the starting PRB of the random access channel resource and the ending PRB of the first initial uplink bandwidth part is less than or equal to the maximum bandwidth configuration value corresponding to the first type of UE in the operating frequency band. (2.4) A frequency domain bandwidth between the starting PRB of the random access channel resource and the ending PRB of the first initial uplink bandwidth part is less than or equal to the bandwidth of the second initial uplink bandwidth part. The offset of the ending PRB of the random access channel resource relative to the ending PRB of the first initial uplink bandwidth part is indicated by N2 PRBs, where N2 is an integer greater than or equal to 0.

In this embodiment, the second initial UL BWP and the first initial UL BWP have the same ending position. The starting PRB of the random access channel resource refers to the frequency domain resource corresponding to the starting position of the PRBs of the random access channel resource. The ending PRB of the random access channel resource refers to the frequency domain resource corresponding to the ending position of the PRBs of the random access channel resource. The starting PRB of the first initial UL BWP refers to the frequency domain resource corresponding to the starting position of the PRBs of the first initial UL BWP. The ending PRB of the first initial UL BWP refers to the frequency domain resource corresponding to the ending position of the PRBs of the first initial UL BWP.

For (2.3), whether the frequency domain bandwidth between the ending PRB of the random access channel resource and the starting PRB of the first initial UL BWP is less than or equal to the maximum bandwidth configuration value corresponding to the first type of UE in the operating frequency band may be determined by the index of the ending PRB of the random access channel resource. For example, if the index of the ending PRB of the random access channel resource is greater than or equal to A2, it indicates that the frequency domain bandwidth is less than or equal to the maximum bandwidth configuration value corresponding to the first type of UE in the operating frequency band.

For (2.4), whether the frequency domain bandwidth between the ending PRB of the random access channel resource and the starting PRB of the first initial UL BWP is less than or equal to the bandwidth of the second initial uplink bandwidth part may be determined by the index of the ending PRB of the random access channel resource. For example, if the index of the ending PRB of the random access channel resource is greater than or equal to A2, it indicates that the frequency domain bandwidth is less than or equal to the bandwidth of the second initial UL BWP.

Figure 5:
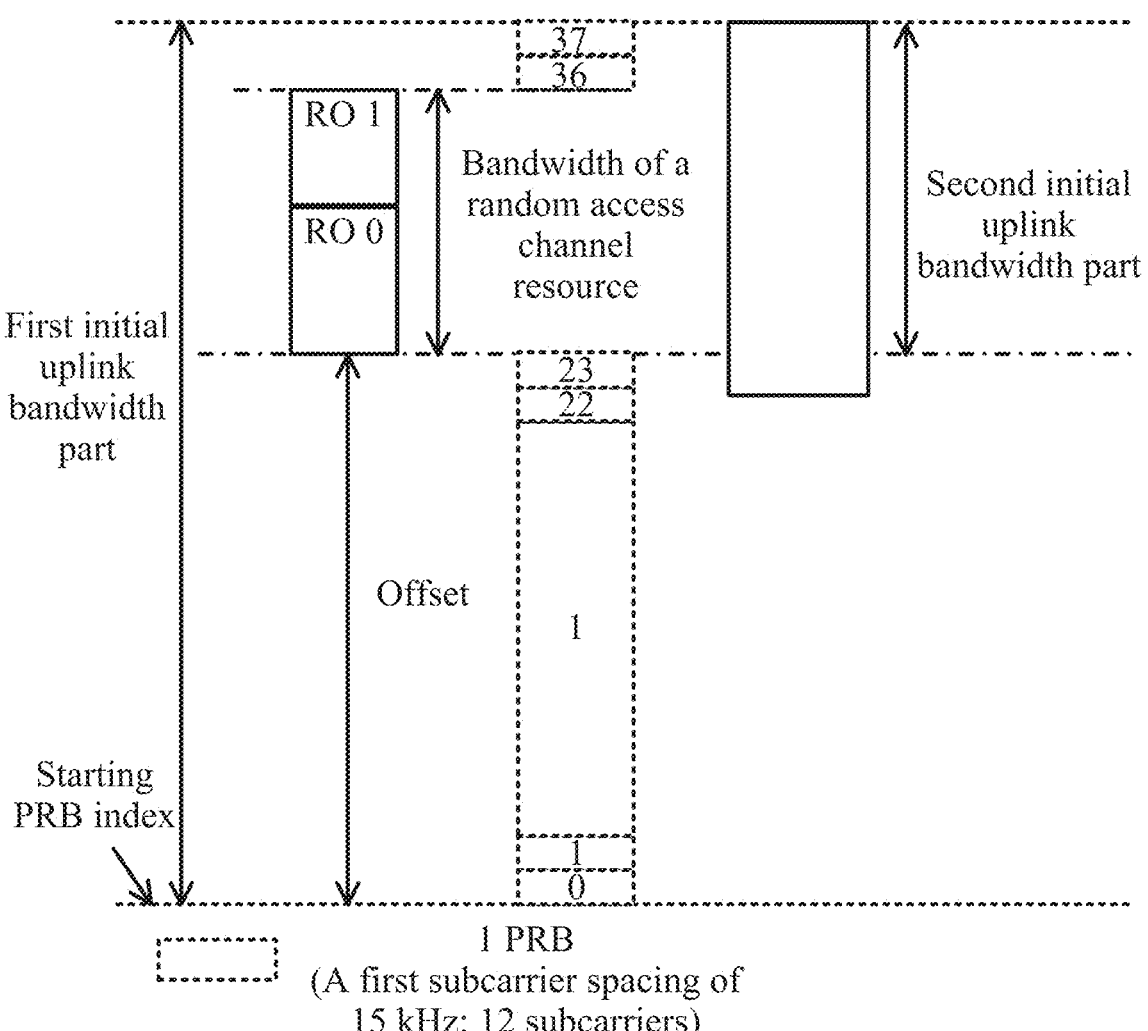
FIG. 5 is a schematic diagram of a first initial uplink bandwidth part and a second initial uplink bandwidth part having the same ending physical resource block according to an embodiment.

FIG. 5 is a schematic diagram of a first initial uplink bandwidth part and a second initial uplink bandwidth part having the same ending PRB according to an embodiment. As shown in FIG. 5, Offset PRB is 24. One RO occupies 6 PRBs in the frequency domain, and two ROs occupy 12 PRBs in total. An interval between the ending PRB of the random access channel resource and the ending PRB of the initial UL BWP is 2 PRBs.

In the case where one or more of the conditions below are satisfied, the ending PRB of the second initial UL BWP is the ending PRB of the first initial UL BWP.

The interval between the ending PRB of ROs and the ending PRB of the initial UL BWP+BW of ROs 20 MHz for FR1 (or 100 MHz for FR2). The interval between the ending PRB of ROs and the ending PRB of the initial UL BWP+BW of ROs the bandwidth of the second initial UL BWP configured by the network side for the RedCap UE. The frequency domain bandwidth between the starting PRB of the random access channel resource and the ending PRB of the first initial UL BWP≤20 MHz for FR1 (or 100 MHz for FR2). The frequency domain bandwidth between the starting PRB of the random access channel resource and the ending PRB of the first initial UL BWP≤the bandwidth of the second initial UL BWP configured by the network side for the RedCap UE. The index of the ending PRB of the random access channel resource A2.

BW of ROs denotes the bandwidth of the random access channel resource, 20 MHz for FR1 represents that the maximum bandwidth configuration value corresponding to the RedCap UE in the first frequency band is 20 MHz, and 100 MHz for FR2 represents that the maximum bandwidth configuration value corresponding to the RedCap UE in the second frequency band is 100 MHz.

In an embodiment, the second initial uplink bandwidth part includes one or more RBGs, and each RBG includes n physical resource blocks, where n is a positive integer. A value of n is determined according to the bandwidth of the first initial uplink bandwidth part, configured by the network side, or a default value.

In an embodiment, the RBG is used for a frequency domain resource configuration of the first initial uplink bandwidth part.

In an embodiment, a starting RBG of the second initial uplink bandwidth part includes the starting physical resource block of the random access channel resource.

Figure 6:
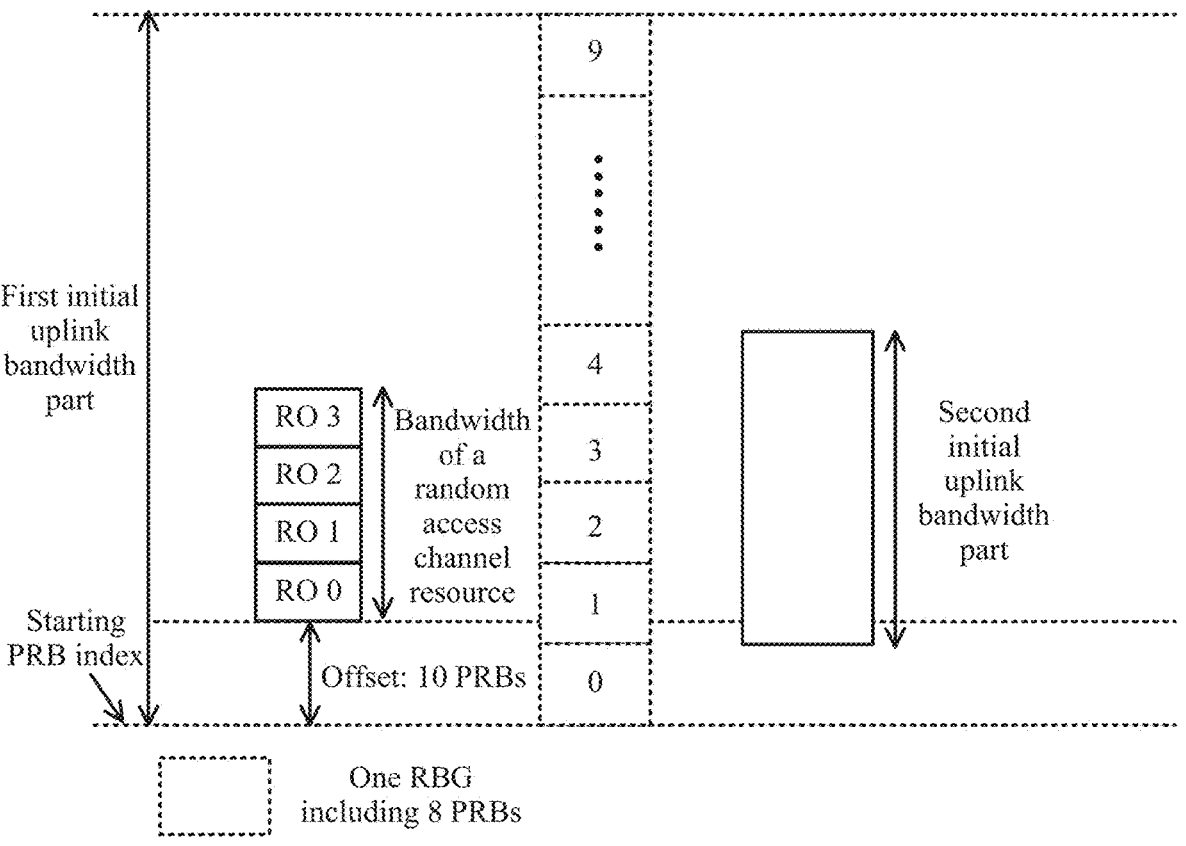
FIG. 6 is a schematic diagram of a starting resource block group of a second initial uplink bandwidth part according to an embodiment.

FIG. 6 is a schematic diagram of a starting resource block group of a second initial uplink bandwidth part according to an embodiment. As shown in FIG. 6, the network side configures the first initial UL BWP for the NR UE, and the frequency domain bandwidth occupied by the first initial UL BWP exceeds the maximum operating bandwidth of the RedCap UE. The index of the starting PRB of the first initial UL BWP may be configured by the network side. Offset PRB denotes the offset of the starting position of the random access channel occasions relative to the starting PRB of the first initial UL BWP. The offset is measured by the PRB with SCS1=15 kHz, where one PRB includes 12 subcarriers. In FIG. 6, Offset PRB=10 (that is, the offset is 10 PRBs). One RO occupies 6 PRBs in the frequency domain, and four ROs occupy 24 PRBs in total.

The frequency domain resource corresponding to the second initial UL BWP needs to include all the frequency domain resources of the at least one random access channel occasion.

The first initial UL BWP is divided into multiple RBGs, where one RBG includes n PRBs, and the value of n is configured by the network side or implicitly indicated according to the size of the bandwidth of the first initial UL BWP.

In this embodiment, n=8, that is, one RBG=8 PRBs. The starting PRB of the second initial UL BWP needs to be aligned with an RBG. Since the frequency domain resource corresponding to the second initial UL BWP needs to include all the frequency domain resources of the at least one random access channel occasion, the starting PRB of the second initial UL BWP is a starting PRB corresponding to RBG1.

The bandwidth of the second initial UL BWP is configured by the network side (unit: RBG) or is 20 MHz for FR1 or 100 MHz for FR2 by default.

In an embodiment, in the case where the first condition is satisfied, a starting PRB in the starting resource block group of the second initial uplink bandwidth part is the same as the starting PRB of the first initial uplink bandwidth part or the starting frequency domain position of the second initial uplink bandwidth part is the same as the starting frequency domain position of the first initial uplink bandwidth part; where the first condition includes at least one of the conditions below.

(1.1) The sum of the bandwidth of the random access channel resource and the offset of the starting PRB of the random access channel resource relative to the starting PRB of the first initial uplink bandwidth part is less than or equal to the maximum bandwidth configuration value corresponding to the first type of UE in the operating frequency band. (1.2) The sum of the bandwidth of the random access channel resource and the offset of the starting PRB of the random access channel resource relative to the starting PRB of the first initial uplink bandwidth part is less than or equal to the bandwidth of the second initial uplink bandwidth part. (1.3) The frequency domain bandwidth between the ending PRB of the random access channel resource and the starting PRB of the first initial uplink bandwidth part is less than or equal to the maximum bandwidth configuration value corresponding to the first type of UE in the operating frequency band. (1.4) The frequency domain bandwidth between the ending PRB of the random access channel resource and the starting PRB of the first initial uplink bandwidth part is less than or equal to the bandwidth of the second initial uplink bandwidth part. The offset of the starting PRB of the random access channel resource relative to the starting PRB of the first initial uplink bandwidth part is indicated by the N1 PRBs, where N1 is an integer greater than or equal to 0.

In this embodiment, the second initial UL BWP and the first initial UL BWP have the same starting position.

For (1.3), whether the frequency domain bandwidth between the ending PRB of the random access channel resource and the starting PRB of the first initial UL BWP is less than or equal to the maximum bandwidth configuration value corresponding to the first type of UE in the operating frequency band may be determined by the index of the ending PRB of the random access channel resource. For example, if the index of the ending PRB of the random access channel resource is less than or equal to A1, it indicates that the frequency domain bandwidth is less than or equal to the maximum bandwidth configuration value corresponding to the first type of UE in the operating frequency band.

For (1.4), whether the frequency domain bandwidth between the ending PRB of the random access channel resource and the starting PRB of the first initial UL BWP is less than or equal to the bandwidth of the second initial UL BWP may be determined by the index of the ending PRB of the random access channel resource. For example, if the index of the ending PRB of the random access channel resource is less than or equal to A1, it indicates that the frequency domain bandwidth is less than or equal to the bandwidth of the second initial UL BWP.

Figure 7:
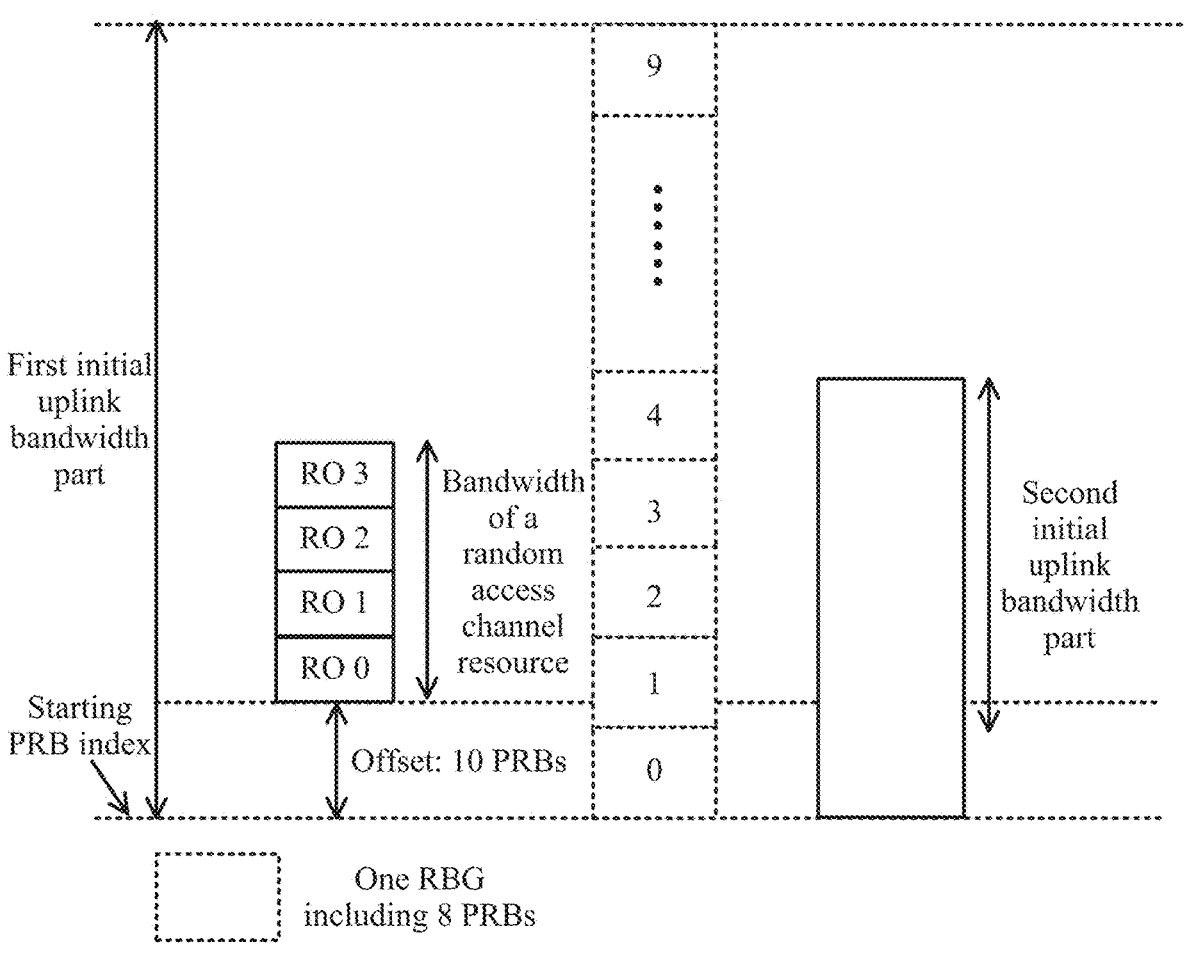
FIG. 7 is a schematic diagram of a first initial uplink bandwidth part and a second initial uplink bandwidth part having the same starting resource block group according to an embodiment.

FIG. 7 is a schematic diagram of a first initial uplink bandwidth part and a second initial uplink bandwidth part having the same starting resource block group according to an embodiment. As shown in FIG. 7, in the case where one or more of the conditions below are satisfied, the starting PRB of the second initial UL BWP is the starting PRB of the first initial UL BWP.

Offset PRB+BW of ROs≤20 MHz for FR1 (or 100 MHz for FR2). Offset PRB+BW of ROs≤the bandwidth of the second initial UL BWP configured by the network side for the RedCap UE. The frequency domain bandwidth between the ending PRB of the random access channel resource and the starting PRB of the first initial UL BWP≤20 MHz for FR1 (or 100 MHz for FR2). The frequency domain bandwidth between the ending PRB of the random access channel resource and the starting PRB of the first initial UL BWP≤the bandwidth of the second initial UL BWP configured by the network side for the RedCap UE. The index of the ending PRB of the random access channel resource≤A1.

BW of ROs denotes the bandwidth of the random access channel resource, Offset PRB denotes the offset of the starting PRB of the random access channel resource relative to the starting PRB of the first initial UL BWP, 20 MHz for FR1 represents that the maximum bandwidth configuration value corresponding to the RedCap UE in the first frequency band is 20 MHz, and 100 MHz for FR2 represents that the maximum bandwidth configuration value corresponding to the RedCap UE in the second frequency band is 100 MHz.

In an embodiment, in the case where the second condition is satisfied, an ending physical resource block in an ending resource block group of the second initial uplink bandwidth part is the same as the ending physical resource block of the first initial uplink bandwidth part or the ending frequency domain position of the second initial uplink bandwidth part is the same as the ending frequency domain position of the first initial uplink bandwidth part; where the second condition includes at least one of the conditions below.

(2.1) The sum of the bandwidth of the random access channel resource and the offset of the ending physical resource block of the random access channel resource relative to the ending physical resource block of the first initial uplink bandwidth part is less than or equal to the maximum bandwidth configuration value corresponding to the first type of UE in the operating frequency band. (2.2) The sum of the bandwidth of the random access channel resource and the offset of the ending physical resource block of the random access channel resource relative to the ending physical resource block of the first initial uplink bandwidth part is less than or equal to the bandwidth of the second initial uplink bandwidth part. (2.3) The frequency domain bandwidth between the starting physical resource block of the random access channel resource and the ending physical resource block of the first initial uplink bandwidth part is less than or equal to the maximum bandwidth configuration value corresponding to the first type of UE in the operating frequency band. (2.4) The frequency domain bandwidth between the starting physical resource block of the random access channel resource and the ending physical resource block of the first initial uplink bandwidth part is less than or equal to the bandwidth of the second initial uplink bandwidth part. The offset of the ending physical resource block of the random access channel resource relative to the ending physical resource block of the first initial uplink bandwidth part is indicated by the N2 physical resource blocks, where N2 is an integer greater than or equal to 0.

In this embodiment, the second initial UL BWP and the first initial UL BWP have the same ending position.

For (2.3), whether the frequency domain bandwidth between the ending PRB of the random access channel resource and the starting PRB of the first initial uplink bandwidth part is less than or equal to the maximum bandwidth configuration value corresponding to the first type of UE in the operating frequency band may be determined by the index of the ending PRB of the random access channel resource. For example, if the index of the ending PRB of the random access channel resource is greater than or equal to A2, it indicates that the frequency domain bandwidth is less than or equal to the maximum bandwidth configuration value corresponding to the first type of UE in the operating frequency band.

For (2.4), whether the frequency domain bandwidth between the ending PRB of the random access channel resource and the starting PRB of the first initial uplink bandwidth part is less than or equal to the bandwidth of the second initial uplink bandwidth part may be determined by the index of the ending PRB of the random access channel resource. For example, if the index of the ending PRB of the random access channel resource is greater than or equal to A2, it indicates that the frequency domain bandwidth is less than or equal to the bandwidth of the second initial uplink bandwidth part.

Figure 8:
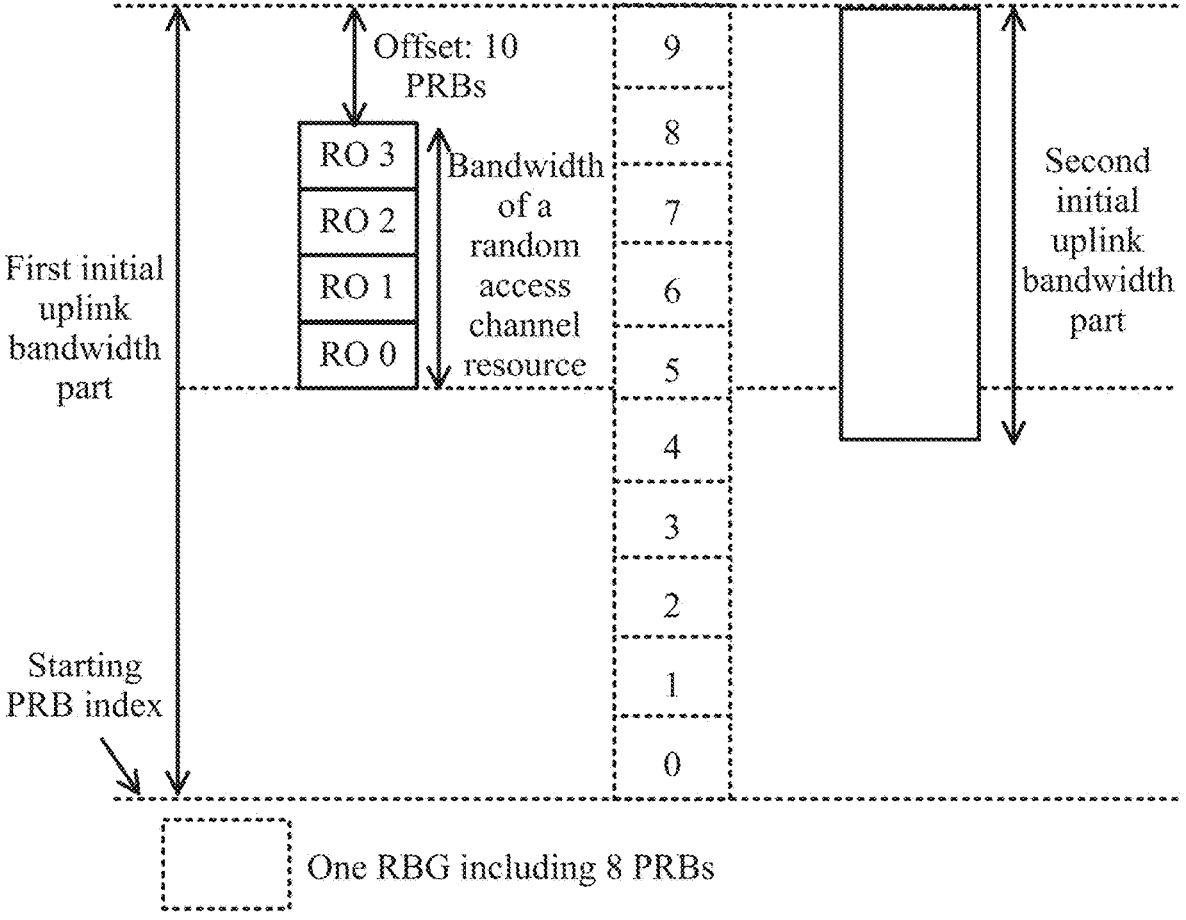
FIG. 8 is a schematic diagram of a first initial uplink bandwidth part and a second initial uplink bandwidth part having the same ending resource block group according to an embodiment.

FIG. 8 is a schematic diagram of a first initial uplink bandwidth part and a second initial uplink bandwidth part having the same ending resource block group according to an embodiment. As shown in FIG. 8, in the case where one or more of the conditions below are satisfied, the ending PRB of the second initial UL BWP is the ending PRB of the first initial UL BWP.

The interval between the ending PRB of ROs and the ending PRB of the initial UL BWP+BW of ROs≤20 MHz for FR1 (or 100 MHz for FR2). The interval between the ending PRB of ROs and the ending PRB of the initial UL BWP+BW of ROs≤the bandwidth of the second initial UL BWP configured by the network side for the RedCap UE. The frequency domain bandwidth between the starting PRB of the random access channel resource and the ending PRB of the first initial UL BWP≤20 MHz for FR1 (or 100 MHz for FR2). The frequency domain bandwidth between the starting PRB of the random access channel resource and the ending PRB of the first initial UL BWP≤the bandwidth of the second initial UL BWP configured by the network side for the RedCap UE. The index of the ending PRB of the random access channel resource≥A2.

BW of ROs denotes the bandwidth of the random access channel resource, 20 MHz for FR1 represents that the maximum bandwidth configuration value corresponding to the RedCap UE in the first frequency band is 20 MHz, and 100 MHz for FR2 represents that the maximum bandwidth configuration value corresponding to the RedCap UE in the second frequency band is 100 MHz.

In an embodiment, the random access channel resource includes a first part of ROs and a second part of ROs.

In an embodiment, the second initial uplink bandwidth part includes a first bandwidth part and a second bandwidth part, where the first bandwidth part includes the first part of ROs in the random access channel resource, and the second bandwidth part includes the second part of ROs in the random access channel resource.

In an embodiment, a boundary between the first bandwidth part and the second bandwidth part is an ending PRB of the first part of ROs, which refers to an ending frequency domain resource position of the ending PRB of the first part of ROs.

Figure 9:
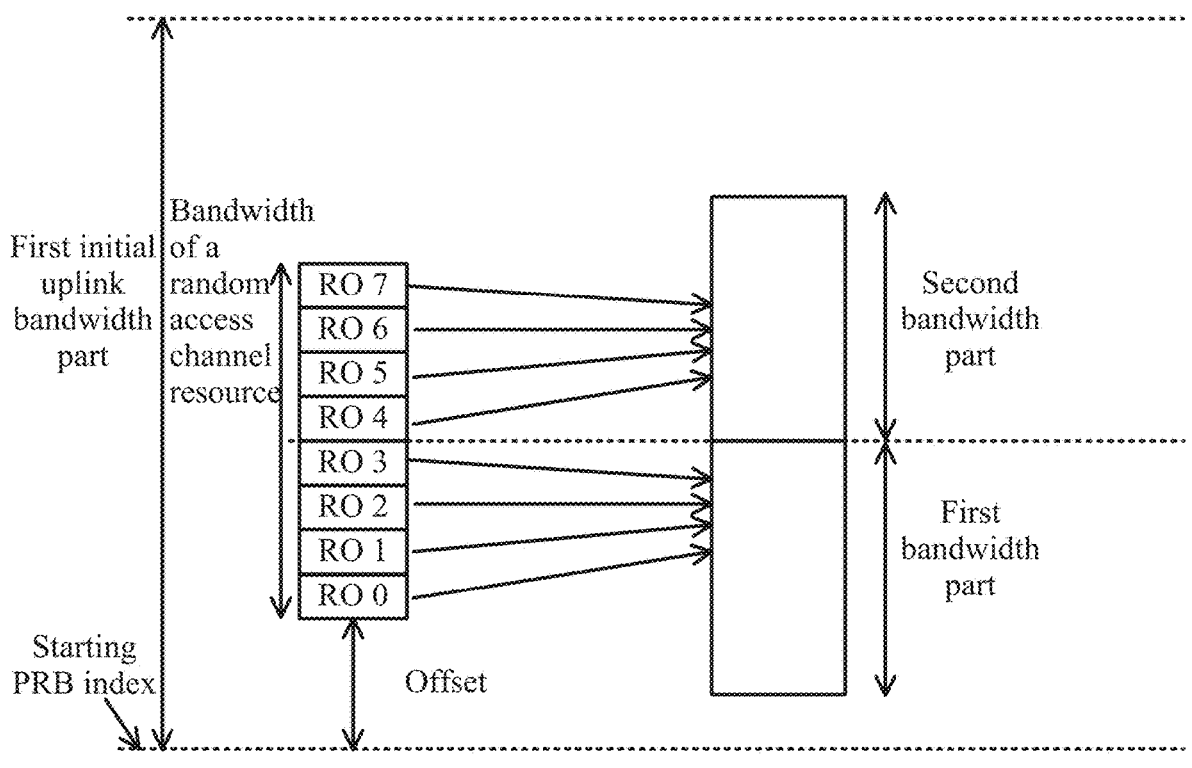
FIG. 9 is a schematic diagram of a first bandwidth part and a second bandwidth part according to an embodiment.

FIG. 9 is a schematic diagram of a first bandwidth part and a second bandwidth part according to an embodiment. In this embodiment, the second initial UL BWP satisfies that a correspondence exists between the second initial UL BWP and the ROs for the RedCap UE to send the preamble of the PRACH. As shown in FIG. 9, the random access channel resource includes the first part of ROs (RO 0 to RO 3) and the second part of ROs (RO 4 to RO 7), the second initial UL BWP includes the first bandwidth part and the second bandwidth part, RO 0 to RO 3 correspond to the first bandwidth part, and RO 4 to RO 7 correspond to the second bandwidth part.

The boundary between the first bandwidth part and the second bandwidth part is an ending PRB of a resource corresponding to a determined RO, which is an ending PRB of RO 3 in FIG. 9.

A bandwidth of the first bandwidth part and a bandwidth of the second bandwidth part may be separately configured by the network side or 20 MHz for FR1 by default (or 100 MHz for FR2 by default).

In an embodiment, a frequency domain bandwidth between a starting PRB of the first bandwidth part and the boundary is less than or equal to a bandwidth between the starting PRB of the first initial uplink bandwidth part and the ending PRB of the first part of ROs.

In this embodiment, the bandwidth of the first bandwidth part (regardless of being configured by the network side or 20 MHz or 100 MHz by default) is limited by the starting PRB of the first initial UL BWP, that is, the bandwidth of the first bandwidth part starts from the starting PRB of the first initial UL BWP at most to the boundary between the second bandwidth part and the first bandwidth part. In an embodiment, a frequency domain bandwidth between an ending PRB of the second bandwidth part and the boundary is less than or equal to a bandwidth between the ending PRB of the first initial uplink bandwidth part and a starting physical resource block of the second part of ROs.

In this embodiment, the bandwidth of the second bandwidth part (regardless of being configured by the network side or 20 MHz or 100 MHz by default) is limited by the ending PRB of the first initial UL BWP, that is, the bandwidth of the second bandwidth part starts from the boundary between the second bandwidth part and the first bandwidth part to the ending PRB of the first initial UL BWP at most.

In an embodiment, in the case where a third condition is satisfied, the starting PRB of the first bandwidth part is the same as the starting PRB of the first initial uplink bandwidth part or a starting frequency domain position of the first bandwidth part is the same as the starting frequency domain position of the first initial uplink bandwidth part; where the third condition includes at least one of the conditions below.

(3.1) A sum of a bandwidth of the first part of random access channel occasions and an offset of a starting PRB of the first part of random access channel occasions relative to the starting PRB of the first initial uplink bandwidth part is less than or equal to the maximum bandwidth configuration value corresponding to the first type of UE in the operating frequency band. (3.2) A sum of a bandwidth of the first part of random access channel occasions and an offset of a starting PRB of the first part of random access channel occasions relative to the starting PRB of the first initial uplink bandwidth part is less than or equal to the bandwidth of the second initial uplink bandwidth part. (3.3) A frequency domain bandwidth between a starting PRB of the first part of random access channel occasions and the ending PRB of the first initial uplink bandwidth part is less than or equal to the maximum bandwidth configuration value corresponding to the first type of UE in the operating frequency band. (3.4) A frequency domain bandwidth between a starting PRB of the first part of random access channel occasions and the ending PRB of the first initial uplink bandwidth part is less than or equal to the bandwidth of the second initial uplink bandwidth part. The offset of the starting PRB of the first part of random access channel occasions relative to the starting PRB of the first initial uplink bandwidth part is indicated by N3 PRBs, where N3 is an integer greater than or equal to 0.

In this embodiment, the first bandwidth part and the first initial UL BWP have the same starting position. The starting PRB of the first part of random access channel occasions refers to a frequency domain resource corresponding to a starting position of PRBs of the first part of random access channel occasions. The ending PRB of the first part of random access channel occasions refers to a frequency domain resource corresponding to an ending position of the PRBs of the first part of random access channel occasions. The starting PRB of the first initial UL BWP refers to the frequency domain resource corresponding to the starting position of the PRBs of the first initial UL BWP. The ending PRB of the first initial UL BWP refers to the frequency domain resource corresponding to the ending position of the PRBs of the first initial UL BWP.

Figure 10:
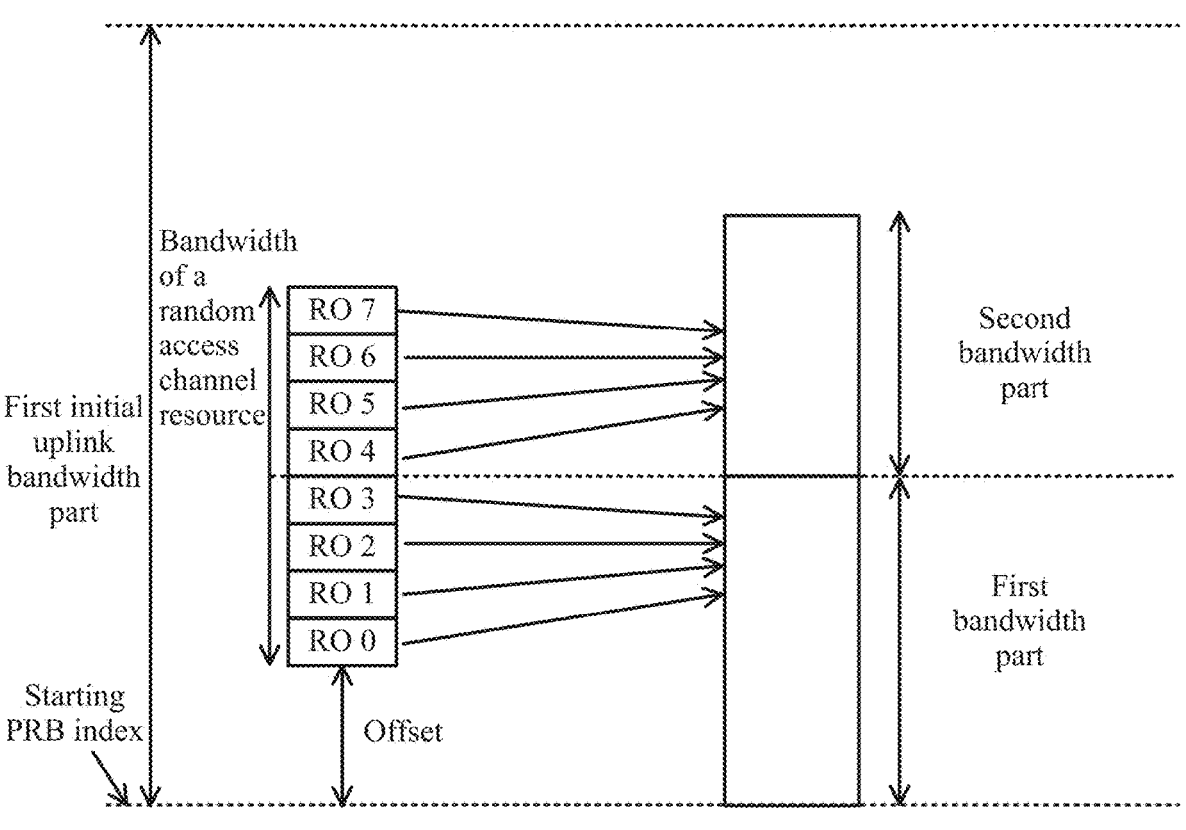
FIG. 10 is a schematic diagram of a first bandwidth part and a first initial uplink bandwidth part having the same starting physical resource block according to an embodiment.

FIG. 10 is a schematic diagram of a first bandwidth part and a first initial uplink bandwidth part having the same starting physical resource block according to an embodiment. As shown in FIG. 10, in the case where the condition below is satisfied, the starting PRB of the first bandwidth part is the starting PRB of the first initial UL BWP.

Offset PRB+BW of the first part of ROs (RO 0 to RO 3)≤20 MHz for FR1 (100 MHz for FR2). Offset PRB+BW of the first part of ROs (RO 0 to RO 3)≤the bandwidth of the second initial UL BWP configured by the network side for the RedCap UE. The frequency domain bandwidth between the starting PRB of the first part of ROs and the ending PRB of the first initial UL BWP≤20 MHz for FR1 (100 MHz for FR2). The frequency domain bandwidth between the starting PRB of the first part of ROs and the ending PRB of the first initial UL BWP≤the bandwidth of the second initial UL BWP configured by the network side for the RedCap UE.

In an embodiment, in the case where a fourth condition is satisfied, the ending physical resource block of the second bandwidth part is the same as the ending physical resource block of the first initial uplink bandwidth part or an ending frequency domain position of the second bandwidth part is the same as the ending frequency domain position of the first initial uplink bandwidth part; where the fourth condition includes at least one of the conditions below.

(4.1) A sum of a bandwidth of the second part of random access channel occasions and an offset of an ending physical resource block of the second part of random access channel occasions relative to the ending physical resource block of the first initial uplink bandwidth part is less than or equal to the maximum bandwidth configuration value corresponding to the first type of UE in the operating frequency band. (4.2) A sum of a bandwidth of the second part of random access channel occasions and an offset of an ending physical resource block of the second part of random access channel occasions relative to the ending physical resource block of the first initial uplink bandwidth part is less than or equal to the bandwidth of the second initial uplink bandwidth part. (4.3) A frequency domain bandwidth between the starting physical resource block of the second part of random access channel occasions and the ending physical resource block of the first initial uplink bandwidth part is less than or equal to the maximum bandwidth configuration value corresponding to the first type of UE in the operating frequency band. (4.4) A frequency domain bandwidth between the starting physical resource block of the second part of random access channel occasions and the ending physical resource block of the first initial uplink bandwidth part is less than or equal to the bandwidth of the second initial uplink bandwidth part. The offset of the ending physical resource block of the second part of random access channel occasions relative to the ending physical resource block of the first initial uplink bandwidth part is indicated by N4 physical resource blocks, where N4 is an integer greater than or equal to 0.

In this embodiment, the second bandwidth part and the first initial UL BWP have the same ending position. The starting PRB of the first part of random access channel occasions refers to the frequency domain resource corresponding to the starting position of the PRBs of the first part of random access channel occasions. The ending PRB of the first part of random access channel occasions refers to the frequency domain resource corresponding to the ending position of the PRBs of the first part of random access channel occasions. The starting PRB of the first initial UL BWP refers to the frequency domain resource corresponding to the starting position of the PRBs of the first initial UL BWP. The ending PRB of the first initial UL BWP refers to the frequency domain resource corresponding to the ending position of the PRBs of the first initial UL BWP.

FIG. 11 is a schematic diagram of a second bandwidth part and a first initial uplink bandwidth part having the same ending physical resource block according to an embodiment. As shown in FIG. 11, in the case where one or more of the conditions below are satisfied, the ending PRB of the second bandwidth part is the ending PRB of the first initial UL BWP.

An interval between the ending PRB of the second part of ROs (an ending PRB of RO 7) and the ending physical resource block of the first initial UL BWP+BW of ROs≤20 MHz for FR1 (or 100 MHz for FR2). The interval between the ending PRB of the second part of ROs and the ending physical resource block of the first initial UL BWP+BW of ROs≤the bandwidth of the second initial UL BWP configured by the network side for the RedCap UE. The frequency domain bandwidth between the starting PRB of the second part of ROs and the ending PRB of the first initial UL BWP≤20 MHz for FR1 (or 100 MHz for FR2). The frequency domain bandwidth between the starting PRB of the second part of ROs and the ending PRB of the first initial UL BWP≤the bandwidth of the second initial UL BWP configured by the network side for the RedCap UE.

In an embodiment, the bandwidth of the first bandwidth part is configured by the network side or is the maximum bandwidth configuration value corresponding to the first type of UE in the operating frequency band; and the bandwidth of the second bandwidth part is configured by the network side or is the maximum bandwidth configuration value corresponding to the first type of UE in the operating frequency band.

In an embodiment, the operating frequency band of the first type of UE includes the first frequency band and the second frequency band; the maximum bandwidth configuration value corresponding to the first type of UE in the first frequency band is 20 MHz; and the maximum bandwidth configuration value corresponding to the first type of UE in the second frequency band is 100 MHz.

In the case where the second initial UL BWP includes one or more resource blocks, as shown in FIGS. 2 to 5, and in the case where a bandwidth occupied by the ROs configured by the network side for frequency-division multiplexing (FDM) is less than or equal to 20 MHz in FR1 or in the case where a bandwidth occupied by the ROs configured by the network side for FDM is less than or equal to 100 MHz in FR2, a PRACH configuration may be one of the configurations below.

1, 2, or 4 ROs are frequency-division multiplexed. 8 ROs are frequency-division multiplexed, and a format of the physical random access channel is a format 0, a format 1, or a format 2. 8 ROs are frequency-division multiplexed, a format of the physical random access channel corresponds to a short preamble, and the subcarrier spacing is 15 kHz. 8 ROs are frequency-division multiplexed, a format of the physical random access channel corresponds to a short preamble, and the subcarrier spacing is 120 kHz.

In the case where the second initial UL BWP includes one or more resource block groups, as shown in FIGS. 6 to 8, and in the case where the bandwidth occupied by the ROs configured by the network side for FDM is less than or equal to 20 MHz in FR1 or in the case where the bandwidth occupied by the ROs configured by the network side for FDM is less than or equal to 100 MHz in FR2, the PRACH configuration may be one of the configurations below.

1, 2, or 4 ROs are frequency-division multiplexed. 8 ROs are frequency-division multiplexed, and the format of the physical random access channel is the format 0, the format 1, or the format 2. 8 ROs are frequency-division multiplexed, the format of the physical random access channel corresponds to the short preamble, and the subcarrier spacing is 15 kHz. 8 ROs are frequency-division multiplexed, the format of the physical random access channel corresponds to the short preamble, and the subcarrier spacing is 60 kHz.

In the case where the second initial UL BWP includes the first bandwidth part and the second bandwidth part, as shown in FIGS. 9 to 11, and in the case where the bandwidth occupied by the ROs configured by the network side for FDM is less than or equal to 20 MHz in FR1 or in the case where the bandwidth occupied by the ROs configured by the network side for FDM is less than or equal to 100 MHz in FR2, the PRACH configuration may be one of the configurations below.

8 ROs are frequency-division multiplexed, and the format of the physical random access channel is a format 3. 8 ROs are frequency-division multiplexed, the format of the physical random access channel corresponds to the short preamble, the subcarrier spacing is 30 kHz, and the 8 ROs have a bandwidth of 34.56 MHz. 8 ROs are frequency-division multiplexed, the format of the physical random access channel corresponds to the short preamble, the subcarrier spacing is 120 kHz, and the 8 ROs have a bandwidth of 138.24 MHz.

In an embodiment, the method further includes step 112.

In step 112, a frequency domain resource occupied by the second initial uplink bandwidth part is determined according to at least one of: (a) the number of random access channel occasions in the random access channel resource; (b) a frequency domain bandwidth corresponding to the random access channel resource; (c) a starting frequency domain position of the random access channel resource; (d) an ending frequency domain position of the random access channel resource; (e) the starting frequency domain position of the first initial uplink bandwidth part; (f) the ending frequency domain position of the first initial uplink bandwidth part; (g) the bandwidth of the first initial uplink bandwidth part; or (h) the bandwidth of the second initial uplink bandwidth part.

In this embodiment, in the process of configuring the second initial UL BWP, the frequency domain resource occupied by the second initial UL BWP is further determined, where the frequency domain resource occupied by the second initial UL BWP is related to one or more of the preceding information (a) to (h). The bandwidth of the second initial UL BWP is configured by the network side or is the maximum bandwidth configuration value corresponding to the first type of UE in the operating frequency band (including the FR1 and the FR2).

In an embodiment, in the case where a fifth condition is satisfied, the starting PRB or the starting RBG of the second initial uplink bandwidth part is the starting PRB or a starting RBG of the first initial uplink bandwidth part; where the fifth condition includes the condition below.

A frequency domain bandwidth between (d) the ending frequency domain position of the random access channel resource and (e) the starting frequency domain position of the first initial uplink bandwidth part is less than or equal to (h) the bandwidth of the second initial uplink bandwidth part.

In an embodiment, in the case where a sixth condition is satisfied, the ending PRB or the ending RBG of the second initial uplink bandwidth part is the ending PRB or an ending RBG of the first initial uplink bandwidth part; where the sixth condition includes the condition below.

A frequency domain bandwidth between (c) the starting frequency domain position of the random access channel resource and (f) the ending frequency domain position of the first initial uplink bandwidth part is less than or equal to (h) the bandwidth of the second initial uplink bandwidth part.

In an embodiment, in the case where a seventh condition is satisfied, the starting PRB or the starting RBG of the second initial uplink bandwidth part is a PRB or a starting RBG including the starting frequency domain position of the random access channel resource; where the seventh condition includes at least one of the conditions below.

The frequency domain bandwidth between (d) the ending frequency domain position of the random access channel resource and (e) the starting frequency domain position of the first initial uplink bandwidth part is greater than (h) the bandwidth of the second initial uplink bandwidth part. The frequency domain bandwidth between (c) the starting frequency domain position of the random access channel resource and (f) the ending frequency domain position of the first initial uplink bandwidth part is greater than (h) the bandwidth of the second initial uplink bandwidth part.

In an embodiment, in the case where an eighth condition is satisfied, the ending PRB or the starting RBG of the second initial uplink bandwidth part is a PRB or a starting RBG including the ending frequency domain position of the random access channel resource; where the eighth condition includes at least one of the conditions below.

The frequency domain bandwidth between (d) the ending frequency domain position of the random access channel resource and (e) the starting frequency domain position of the first initial uplink bandwidth part is greater than (h) the bandwidth of the second initial uplink bandwidth part. The frequency domain bandwidth between (c) the starting frequency domain position of the random access channel resource and (f) the ending frequency domain position of the first initial uplink bandwidth part is greater than (h) the bandwidth of the second initial uplink bandwidth part.

In an embodiment, step 120 includes the step below.

In the case where (a) the number of random access channel occasions in the random access channel resource is greater than or equal to a determined value T or in the case where (b) the frequency domain bandwidth corresponding to the random access channel resource is greater than or equal to a determined value N, two second initial uplink bandwidth parts are configured.

T may be a value configured by default or a value configured by the network side.

N may be configured by default or by the network side or may be the maximum bandwidth configuration value corresponding to the first type of UE in the operating frequency band.

In an embodiment, in the case where a ninth condition is satisfied, a starting PRB or a starting RBG of one second initial uplink bandwidth part (for example, the first bandwidth part in the preceding embodiment) of the two second initial uplink bandwidth parts is the starting PRB or the starting RBG of the first initial uplink bandwidth part; where the ninth condition includes the condition below.

A frequency domain bandwidth between a sum of frequency domain bandwidths corresponding to random access channel occasions whose indexes are less than or equal to a determined value D and (e) the starting frequency domain position of the first initial uplink bandwidth part is less than or equal to (h) the bandwidth of the second initial uplink bandwidth part.

D may be a value configured by default or a value configured by the network side.

In an embodiment, an ending PRB or an ending RBG of the one second initial uplink bandwidth part (for example, the first bandwidth part in the preceding embodiment) is a PRB or an ending RBG corresponding to an ending frequency domain position of a random access channel occasion with an index of D.

In an embodiment, a starting PRB or a starting RBG of the other second initial uplink bandwidth part (for example, the second bandwidth part in the preceding embodiment) of the two second initial uplink bandwidth parts is a PRB or a starting RBG corresponding to a starting frequency domain position of a random access channel occasion with an index of D+1.

In an embodiment, in the case where a tenth condition is satisfied, an ending PRB or an ending RBG of one second initial uplink bandwidth part (for example, the first bandwidth part in the preceding embodiment) of the two second initial uplink bandwidth parts is the ending PRB or the ending RBG of the first initial uplink bandwidth part; where the tenth condition includes the condition below.

A frequency domain bandwidth between a sum of frequency domain bandwidths corresponding to random access channel occasions whose indexes are greater than or equal to a determined value E and (f) the ending frequency domain position of the first initial uplink bandwidth part is less than or equal to (h) the bandwidth of the second initial uplink bandwidth part.

E may be a value configured by default or a value configured by the network side.

In an embodiment, the starting PRB or the starting RBG of the one second initial uplink bandwidth part (for example, the first bandwidth part in the preceding embodiment) is a PRB or a starting RBG corresponding to a starting frequency domain position of a random access channel occasion with an index of E.

In an embodiment, the ending PRB or the ending RBG of the other second initial uplink bandwidth part of the two second initial uplink bandwidth parts is a PRB or an ending RBG corresponding to an ending frequency domain position of a random access channel occasion with an index of E−1.

In an embodiment, the two second initial uplink bandwidth parts are consecutive in the frequency domain, and a frequency domain boundary between the two second initial uplink bandwidth parts is a PRB or an RBG corresponding to an ending frequency domain position of a determined random access channel occasion.

FIG. 12 is a flowchart of a transmission method according to one embodiment. The method is applied by a first type of UE, for example, a RedCap UE. As shown in FIG. 12, the method provided in this embodiment includes steps 210 and 220.

In step 210, a second initial uplink bandwidth part is determined, where a bandwidth of the second initial uplink bandwidth part is smaller than a bandwidth of a first initial uplink bandwidth part, the first initial uplink bandwidth part includes a random access channel resource, the random access channel resource includes at least one random access channel occasion, and the at least one random access channel occasion is used for transmitting a random access preamble.

In step 220, the random access preamble is transmitted through a frequency domain resource in the second initial uplink bandwidth part.

In the transmission method provided by the embodiment of the present application, the first type of UE sends the random access preamble by using the frequency domain resource in the second initial uplink bandwidth part, and the bandwidth of the second initial uplink bandwidth part is relatively small, thereby ensuring that the first type of UE successfully sends the random access preamble and improving the reliability of an initial access procedure.

In an embodiment, the bandwidth of the second initial uplink bandwidth part is configured by a network side; or the bandwidth of the second initial uplink bandwidth part is a maximum bandwidth configuration value corresponding to the first type of UE in an operating frequency band.

In an embodiment, the second initial uplink bandwidth part includes the random access channel resource.

In an embodiment, a starting physical resource block of the second initial uplink bandwidth part is the same as a starting physical resource block of the random access channel resource.

In an embodiment, a physical resource block of the random access channel resource corresponds to a first subcarrier spacing, and a physical resource block of the second initial uplink bandwidth part corresponds to a second subcarrier spacing, where in the case where the first subcarrier spacing is different from the second subcarrier spacing, the starting physical resource block of the second initial uplink bandwidth part is a physical resource block including the starting physical resource block of the random access channel resource and having the second subcarrier spacing.

In an embodiment, in the case where a first condition is satisfied, the starting physical resource block of the second initial uplink bandwidth part is the same as a starting physical resource block of the first initial uplink bandwidth part or a starting frequency domain position of the second initial uplink bandwidth part is the same as a starting frequency domain position of the first initial uplink bandwidth part; where the first condition includes at least one of the conditions below.

A sum of a bandwidth of the random access channel resource and an offset of the starting physical resource block of the random access channel resource relative to the starting physical resource block of the first initial uplink bandwidth part is less than or equal to the maximum bandwidth configuration value corresponding to the first type of UE in the operating frequency band. A sum of a bandwidth of the random access channel resource and an offset of the starting physical resource block of the random access channel resource relative to the starting physical resource block of the first initial uplink bandwidth part is less than or equal to the bandwidth of the second initial uplink bandwidth part. A frequency domain bandwidth between an ending physical resource block of the random access channel resource and the starting physical resource block of the first initial uplink bandwidth part is less than or equal to the maximum bandwidth configuration value corresponding to the first type of UE in the operating frequency band. A frequency domain bandwidth between an ending physical resource block of the random access channel resource and the starting physical resource block of the first initial uplink bandwidth part is less than or equal to the bandwidth of the second initial uplink bandwidth part. The offset of the starting physical resource block of the random access channel resource relative to the starting physical resource block of the first initial uplink bandwidth part is indicated by N1 physical resource blocks, where N1 is an integer greater than or equal to 0.

In an embodiment, in the case where a second condition is satisfied, an ending physical resource block of the second initial uplink bandwidth part is the same as an ending physical resource block of the first initial uplink bandwidth part or an ending frequency domain position of the second initial uplink bandwidth part is the same as an ending frequency domain position of the first initial uplink bandwidth part; where the second condition includes at least one of the conditions below.

A sum of the bandwidth of the random access channel resource and an offset of the ending physical resource block of the random access channel resource relative to the ending physical resource block of the first initial uplink bandwidth part is less than or equal to the maximum bandwidth configuration value corresponding to the first type of UE in the operating frequency band. A sum of the bandwidth of the random access channel resource and an offset of the ending physical resource block of the random access channel resource relative to the ending physical resource block of the first initial uplink bandwidth part is less than or equal to the bandwidth of the second initial uplink bandwidth part. A frequency domain bandwidth between the starting physical resource block of the random access channel resource and the ending physical resource block of the first initial uplink bandwidth part is less than or equal to the maximum bandwidth configuration value corresponding to the first type of UE in the operating frequency band. A frequency domain bandwidth between the starting physical resource block of the random access channel resource and the ending physical resource block of the first initial uplink bandwidth part is less than or equal to the bandwidth of the second initial uplink bandwidth part. The offset of the ending physical resource block of the random access channel resource relative to the ending physical resource block of the first initial uplink bandwidth part is indicated by N2 physical resource blocks, where N2 is an integer greater than or equal to 0.

In an embodiment, the second initial uplink bandwidth part includes one or more resource block groups, and each resource block group includes n physical resource blocks, where n is a positive integer. A value of n is determined according to the bandwidth of the first initial uplink bandwidth part, configured by the network side, or a default value.

In an embodiment, the resource block group is used for a frequency domain resource configuration of the first initial uplink bandwidth part.

In an embodiment, a starting resource block group of the second initial uplink bandwidth part includes the starting physical resource block of the random access channel resource.

In an embodiment, in the case where the first condition is satisfied, a starting physical resource block in the starting resource block group of the second initial uplink bandwidth part is the same as the starting physical resource block of the first initial uplink bandwidth part or the starting frequency domain position of the second initial uplink bandwidth part is the same as the starting frequency domain position of the first initial uplink bandwidth part; where the first condition includes at least one of the conditions below.

The sum of the bandwidth of the random access channel resource and the offset of the starting physical resource block of the random access channel resource relative to the starting physical resource block of the first initial uplink bandwidth part is less than or equal to the maximum bandwidth configuration value corresponding to the first type of UE in the operating frequency band. The sum of the bandwidth of the random access channel resource and the offset of the starting physical resource block of the random access channel resource relative to the starting physical resource block of the first initial uplink bandwidth part is less than or equal to the bandwidth of the second initial uplink bandwidth part. The frequency domain bandwidth between the ending physical resource block of the random access channel resource and the starting physical resource block of the first initial uplink bandwidth part is less than or equal to the maximum bandwidth configuration value corresponding to the first type of UE in the operating frequency band. The frequency domain bandwidth between the ending physical resource block of the random access channel resource and the starting physical resource block of the first initial uplink bandwidth part is less than or equal to the bandwidth of the second initial uplink bandwidth part. The offset of the starting physical resource block of the random access channel resource relative to the starting physical resource block of the first initial uplink bandwidth part is indicated by the N1 physical resource blocks, where N1 is an integer greater than or equal to 0.

In an embodiment, in the case where the second condition is satisfied, an ending physical resource block in an ending resource block group of the second initial uplink bandwidth part is the same as the ending physical resource block of the first initial uplink bandwidth part or the ending frequency domain position of the second initial uplink bandwidth part is the same as the ending frequency domain position of the first initial uplink bandwidth part; where the second condition includes at least one of the conditions below.

The sum of the bandwidth of the random access channel resource and the offset of the ending physical resource block of the random access channel resource relative to the ending physical resource block of the first initial uplink bandwidth part is less than or equal to the maximum bandwidth configuration value corresponding to the first type of UE in the operating frequency band. The sum of the bandwidth of the random access channel resource and the offset of the ending physical resource block of the random access channel resource relative to the ending physical resource block of the first initial uplink bandwidth part is less than or equal to the bandwidth of the second initial uplink bandwidth part. The frequency domain bandwidth between the starting physical resource block of the random access channel resource and the ending physical resource block of the first initial uplink bandwidth part is less than or equal to the maximum bandwidth configuration value corresponding to the first type of UE in the operating frequency band. The frequency domain bandwidth between the starting physical resource block of the random access channel resource and the ending physical resource block of the first initial uplink bandwidth part is less than or equal to the bandwidth of the second initial uplink bandwidth part. The offset of the ending physical resource block of the random access channel resource relative to the ending physical resource block of the first initial uplink bandwidth part is indicated by the N2 physical resource blocks, where N2 is an integer greater than or equal to 0.

In an embodiment, the random access channel resource includes a first part of random access channel occasions and a second part of random access channel occasions.

In an embodiment, the second initial uplink bandwidth part includes a first bandwidth part and a second bandwidth part, where the first bandwidth part includes the first part of random access channel occasions in the random access channel resource, and the second bandwidth part includes the second part of random access channel occasions in the random access channel resource.

In an embodiment, a boundary between the first bandwidth part and the second bandwidth part is an ending physical resource block of the first part of random access channel occasions.

In an embodiment, a frequency domain bandwidth between a starting physical resource block of the first bandwidth part and the boundary is less than or equal to a bandwidth between the starting physical resource block of the first initial uplink bandwidth part and the ending physical resource block of the first part of random access channel occasions.

In an embodiment, a frequency domain bandwidth between an ending physical resource block of the second bandwidth part and the boundary is less than or equal to a bandwidth between the ending physical resource block of the first initial uplink bandwidth part and a starting physical resource block of the second part of random access channel occasions.

In an embodiment, in the case where a third condition is satisfied, the starting physical resource block of the first bandwidth part is the same as the starting physical resource block of the first initial uplink bandwidth part or a starting frequency domain position of the first bandwidth part is the same as the starting frequency domain position of the first initial uplink bandwidth part; where the third condition includes at least one of the conditions below.

A sum of a bandwidth of the first part of random access channel occasions and an offset of a starting physical resource block of the first part of random access channel occasions relative to the starting physical resource block of the first initial uplink bandwidth part is less than or equal to the maximum bandwidth configuration value corresponding to the first type of UE in the operating frequency band. A sum of a bandwidth of the first part of random access channel occasions and an offset of a starting physical resource block of the first part of random access channel occasions relative to the starting physical resource block of the first initial uplink bandwidth part is less than or equal to the bandwidth of the second initial uplink bandwidth part. A frequency domain bandwidth between a starting physical resource block of the first part of random access channel occasions and the ending physical resource block of the first initial uplink bandwidth part is less than or equal to the maximum bandwidth configuration value corresponding to the first type of UE in the operating frequency band. A frequency domain bandwidth between a starting physical resource block of the first part of random access channel occasions and the ending physical resource block of the first initial uplink bandwidth part is less than or equal to the bandwidth of the second initial uplink bandwidth part. The offset of the starting physical resource block of the first part of random access channel occasions relative to the starting physical resource block of the first initial uplink bandwidth part is indicated by N3 physical resource blocks, where N3 is an integer greater than or equal to 0.

In an embodiment, in the case where a fourth condition is satisfied, the ending physical resource block of the second bandwidth part is the same as the ending physical resource block of the first initial uplink bandwidth part or an ending frequency domain position of the second bandwidth part is the same as the ending frequency domain position of the first initial uplink bandwidth part; where the fourth condition includes at least one of the conditions below.

A sum of a bandwidth of the second part of random access channel occasions and an offset of an ending physical resource block of the second part of random access channel occasions relative to the ending physical resource block of the first initial uplink bandwidth part is less than or equal to the maximum bandwidth configuration value corresponding to the first type of UE in the operating frequency band. A sum of a bandwidth of the second part of random access channel occasions and an offset of an ending physical resource block of the second part of random access channel occasions relative to the ending physical resource block of the first initial uplink bandwidth part is less than or equal to the bandwidth of the second initial uplink bandwidth part. A frequency domain bandwidth between the starting physical resource block of the second part of random access channel occasions and the ending physical resource block of the first initial uplink bandwidth part is less than or equal to the maximum bandwidth configuration value corresponding to the first type of UE in the operating frequency band. A frequency domain bandwidth between the starting physical resource block of the second part of random access channel occasions and the ending physical resource block of the first initial uplink bandwidth part is less than or equal to the bandwidth of the second initial uplink bandwidth part. The offset of the ending physical resource block of the second part of random access channel occasions relative to the ending physical resource block of the first initial uplink bandwidth part is indicated by N4 physical resource blocks, where N4 is an integer greater than or equal to 0.

In an embodiment, a bandwidth of the first bandwidth part is configured by the network side or is the maximum bandwidth configuration value corresponding to the first type of UE in the operating frequency band; and a bandwidth of the second bandwidth part is configured by the network side or is the maximum bandwidth configuration value corresponding to the first type of UE in the operating frequency band.

In an embodiment, the operating frequency band of the first type of UE includes a first frequency band and a second frequency band; a maximum bandwidth configuration value corresponding to the first type of UE in the first frequency band is 20 MHz; and a maximum bandwidth configuration value corresponding to the first type of UE in the second frequency band is 100 MHz.

In an embodiment, the random access channel resource satisfies one of the following: the number of frequency-division multiplexed resources is 1, 2, or 4; the number of frequency-division multiplexed resources is 8, and a format of a physical random access channel is a format a format 1, or a format 2; the number of frequency-division multiplexed resources is 8, a format of a physical random access channel corresponds to a short preamble, and a subcarrier spacing is kHz; or the number of frequency-division multiplexed resources is 8, a format of a physical random access channel corresponds to a short preamble, and a subcarrier spacing is 60 kHz.

In an embodiment, the random access channel resource satisfies one of the following: the number of frequency-division multiplexed resources is 8, and the format of the physical random access channel is a format 3; the number of frequency-division multiplexed resources is 8, the format of the physical random access channel corresponds to the short preamble, and the subcarrier spacing is 30 kHz; or the number of frequency-division multiplexed resources is 8, the format of the physical random access channel corresponds to the short preamble, and the subcarrier spacing is 120 kHz.

In an embodiment, the method further includes step 212.

In step 212, a frequency domain resource occupied by the second initial uplink bandwidth part is determined according to at least one of: the number of random access channel occasions in the random access channel resource; a frequency domain bandwidth corresponding to the random access channel resource; a starting frequency domain position of the random access channel resource; an ending frequency domain position of the random access channel resource; the starting frequency domain position of the first initial uplink bandwidth part; the ending frequency domain position of the first initial uplink bandwidth part; the bandwidth of the first initial uplink bandwidth part; or the bandwidth of the second initial uplink bandwidth part.

In an embodiment, in the case where a fifth condition is satisfied, the starting physical resource block or the starting resource block group of the second initial uplink bandwidth part is the starting physical resource block or a starting resource block group of the first initial uplink bandwidth part; where the fifth condition includes the condition below.

A frequency domain bandwidth between the ending frequency domain position of the random access channel resource and the starting frequency domain position of the first initial uplink bandwidth part is less than or equal to the bandwidth of the second initial uplink bandwidth part.

In an embodiment, in the case where a sixth condition is satisfied, the ending physical resource block or the ending resource block group of the second initial uplink bandwidth part is the ending physical resource block or the ending resource block group of the first initial uplink bandwidth part; where the sixth condition includes the condition below.

A frequency domain bandwidth between the starting frequency domain position of the random access channel resource and the ending frequency domain position of the first initial uplink bandwidth part is less than or equal to the bandwidth of the second initial uplink bandwidth part.

In an embodiment, in the case where a seventh condition is satisfied, the starting physical resource block or the starting resource block group of the second initial uplink bandwidth part is a physical resource block or a starting resource block group including the starting frequency domain position of the random access channel resource; where the seventh condition includes at least one of the conditions below.

The frequency domain bandwidth between the ending frequency domain position of the random access channel resource and the starting frequency domain position of the first initial uplink bandwidth part is greater than the bandwidth of the second initial uplink bandwidth part. The frequency domain bandwidth between the starting frequency domain position of the random access channel resource and the ending frequency domain position of the first initial uplink bandwidth part is greater than the bandwidth of the second initial uplink bandwidth part.

In an embodiment, in the case where an eighth condition is satisfied, the ending physical resource block or the starting resource block group of the second initial uplink bandwidth part is a physical resource block or a starting resource block group including the ending frequency domain position of the random access channel resource; where the eighth condition includes at least one of the conditions below.

The frequency domain bandwidth between the ending frequency domain position of the random access channel resource and the starting frequency domain position of the first initial uplink bandwidth part is greater than the bandwidth of the second initial uplink bandwidth part. The frequency domain bandwidth between the starting frequency domain position of the random access channel resource and the ending frequency domain position of the first initial uplink bandwidth part is greater than the bandwidth of the second initial uplink bandwidth part.

In an embodiment, in the case where the number of random access channel occasions in the random access channel resource is greater than or equal to a determined value T or in the case where the frequency domain bandwidth corresponding to the random access channel resource is greater than or equal to a determined value N, two second initial uplink bandwidth parts are configured.

In an embodiment, in the case where a ninth condition is satisfied, a starting physical resource block or a starting resource block group of one second initial uplink bandwidth part of the two second initial uplink bandwidth parts is the starting physical resource block or the starting resource block group of the first initial uplink bandwidth part; where the ninth condition includes the condition below A frequency domain bandwidth between a sum of frequency domain bandwidths corresponding to random access channel occasions whose indexes are less than or equal to a determined value D and the starting frequency domain position of the first initial uplink bandwidth part is less than or equal to the bandwidth of the second initial uplink bandwidth part.

In an embodiment, an ending physical resource block or an ending resource block group of the one second initial uplink bandwidth part is a physical resource block or an ending resource block group corresponding to an ending frequency domain position of a random access channel occasion with an index of D.

In an embodiment, a starting physical resource block or a starting resource block group of the other second initial uplink bandwidth part of the two second initial uplink bandwidth parts is a physical resource block or a starting resource block group corresponding to a starting frequency domain position of a random access channel occasion with an index of D+1.

In an embodiment, in the case where a tenth condition is satisfied, an ending physical resource block or an ending resource block group of one second initial uplink bandwidth part of the two second initial uplink bandwidth parts is the ending physical resource block or the ending resource block group of the first initial uplink bandwidth part; where the tenth condition includes the condition below.

A frequency domain bandwidth between a sum of frequency domain bandwidths corresponding to random access channel occasions whose indexes are greater than or equal to a determined value E and the ending frequency domain position of the first initial uplink bandwidth part is less than or equal to the bandwidth of the second initial uplink bandwidth part.

In an embodiment, the starting physical resource block or the starting resource block group of the one second initial uplink bandwidth part is a physical resource block or a starting resource block group corresponding to a starting frequency domain position of a random access channel occasion with an index of E.

In an embodiment, the ending physical resource block or the ending resource block group of the other second initial uplink bandwidth part of the two second initial uplink bandwidth parts is a physical resource block or an ending resource block group corresponding to an ending frequency domain position of a random access channel occasion with an index of E−1.

In an embodiment, the two second initial uplink bandwidth parts are consecutive in frequency domain, and a frequency domain boundary between the two second initial uplink bandwidth parts is a physical resource block or a resource block group corresponding to an ending frequency domain position of a determined random access channel occasion.

An embodiment of the present application further provides a resource allocation method.

In example 1, the resource allocation method includes the step below.

A PRACH resource is configured for a RedCap UE, where the PRACH resource includes at least one of: a time-frequency resource occupied by a PRACH or a random access preamble sent on a time-frequency resource occupied by a PRACH.

A first type of PRACH resource is configured for a RedCap UE with one receive antenna.

When a bandwidth of an uplink BWP configured for an NR UE is less than or equal to a threshold TH1 (TH1 being greater than or equal to 0), a RedCap UE with two receive antennas uses a second type of PRACH resource. For example, the threshold TH1 is 20 MHz or 100 MHz.

The second type of PRACH resource is configured for the NR UE or configured for an NR UE that does not support or enable a coverage enhancement function.

When the bandwidth of the uplink BWP configured for the NR UE is greater than a threshold TH2 (TH2 being greater than or equal to 0), the RedCap UE with two receive antennas uses a third type of PRACH resource. For example, the threshold TH2 is 20 MHz or 100 MHz.

The third type of PRACH resource is the first type of PRACH resource or is specially configured for the RedCap UE with two receive antennas.

A fourth type of PRACH resource is configured for the RedCap UE with two receive antennas, where the fourth type of PRACH resource is specially configured for the RedCap UE with two receive antennas.

In example 2, the resource allocation method includes the step below.

A PRACH resource is configured for a RedCap UE, where the PRACH resource includes at least one of: a time-frequency resource occupied by a PRACH or a random access preamble sent on a time-frequency resource occupied by a PRACH.

When the RedCap UE is a first type of RedCap UE, the first type of RedCap UE uses a first type of PRACH resource to send a preamble.

The first type of RedCap UE has an antenna size limitation or a device size limitation. The first type of PRACH resource includes at least one of: a PRACH resource configured for an NR UE or a PRACH resource configured for an NR UE that supports or enables a coverage enhancement function; a PRACH resource specially configured for the first type of RedCap UE; or a second type of PRACH resource configured for a RedCap UE with one receive antenna.

When the RedCap UE is a second type of RedCap UE, the second type of RedCap UE has no antenna size limitation or no device size limitation. When the RedCap UE is the second type of RedCap UE, a dedicated PRACH resource is configured for the second type of RedCap UE.

When the RedCap UE is the second type of RedCap UE, the second type of PRACH resource is configured for a second type of RedCap UE with one receive antenna. When the RedCap UE is the second type of RedCap UE and a bandwidth of an uplink BWP configured for the NR UE is less than or equal to a threshold TH1 (TH1 being greater than or equal to 0), a second type of RedCap UE with two receive antennas uses a third type of PRACH resource. For example, the threshold TH1 is 20 MHz or 100 MHz.

The third type of PRACH resource is configured for the NR UE or configured for the NR UE that supports or enables the coverage enhancement function.

When the RedCap UE is the second type of RedCap UE and the bandwidth of the uplink BWP configured for the NR UE is greater than a threshold TH2 (TH2 being greater than or equal to 0), the second type of RedCap UE with two receive antennas uses a fourth type of PRACH resource. For example, the threshold TH2 is 20 MHz or 100 MHz.

The fourth type of PRACH resource is the first type of PRACH resource or is specially configured for the second type of RedCap UE with two receive antennas.

In example 3, the resource allocation method includes the step below.

A PRACH resource is configured for a RedCap UE, where the PRACH resource includes at least one of: a time-frequency resource occupied by a PRACH or a random access preamble sent on a time-frequency resource occupied by a PRACH.

According to characteristics of RedCap UEs, the RedCap UEs are divided into four sets, which are a RedCap UE in a first set, which satisfies one receive antenna and has no antenna size limitation or no device size limitation; a RedCap UE in a second set, which satisfies one receive antenna and has an antenna size limitation or a device size limitation;

a RedCap UE in a third set, which satisfies two receive antennas and has no antenna size limitation or no device size limitation; and a RedCap UE in a fourth set, which satisfies two receive antennas and has an antenna size limitation or a device size limitation, respectively. The PRACH resource includes four sets of PRACH resource configurations for the RedCap UEs in the four sets, respectively.

The PRACH resource includes three sets of PRACH resource configurations, including a first set of PRACH resource configurations configured for the RedCap UE in the first set and the RedCap UE in the second set; a second set of PRACH resource configurations configured for the Red-Cap UE in the fourth set, where the second set of PRACH resource configurations is a PRACH resource configured for an NR UE or a PRACH resource configured for an NR UE that supports or enables a coverage enhancement function; and a third set of PRACH resource configurations config-ured for the RedCap UE in the third set.

The third set of PRACH resource configurations includes at least one of the following: a dedicated PRACH resource configuration for the RedCap UE in the third set; when a bandwidth of an uplink BWP configured for the NR UE is less than or equal to a threshold TH1 (TH1 being greater than or equal to 0), the RedCap UE in the third set uses the second set of PRACH resource configurations, for example, the threshold TH1 is 20 MHz or 100 MHz; or when a bandwidth of an uplink BWP configured for the NR UE is greater than a threshold TH2 (TH2 being greater than or equal to 0), the RedCap UE in the third set uses the first set of PRACH resource configurations or the dedicated PRACH resource configuration for the RedCap UE in the third set, for example, the threshold TH2 is 20 MHz or 100 MHz.

In example 4, the resource allocation method includes the step below.

A PRACH resource is configured for a RedCap UE, where the PRACH resource includes at least one of: a time-frequency resource occupied by a PRACH or a random access preamble sent on a time-frequency resource occupied by a PRACH.

According to characteristics of RedCap UEs, the RedCap UEs are divided into three sets, which are a RedCap UE in a first set, which satisfies one receive antenna and has no antenna size limitation or no device size limitation; a Red-Cap UE in a second set, which satisfies one receive antenna and has an antenna size limitation or a device size limitation; and a RedCap UE in a third set, which satisfies two receive antennas and has no antenna size limitation or no device size limitation, respectively. The PRACH resource includes three sets of PRACH resource configurations for the RedCap UEs in the three sets, respectively.

The PRACH resource includes two sets of PRACH resource configurations, including a first set of PRACH resource configurations configured for the RedCap UE in the first set and the RedCap UE in the second set; and a second set of PRACH resource configurations configured for the RedCap UE in the third set.

The second set of PRACH resource configurations includes at least one of the following: a dedicated PRACH resource configuration for the RedCap UE in the third set; when a bandwidth of an uplink BWP configured for an NR UE is less than or equal to a threshold TH1 (TH1 being greater than or equal to 0), the RedCap UE in the third set uses a PRACH resource configured for the NR UE or a PRACH resource configured for an NR UE that supports or enables a coverage enhancement function, for example, the threshold TH1 is 20 MHz or 100 MHz; or when a bandwidth of an uplink BWP configured for an NR UE is greater than a threshold TH2 (TH2 being greater than or equal to 0), the RedCap UE in the third set uses the first set of PRACH resource configurations or the dedicated PRACH resource configuration for the RedCap UE in the third set, for example, the threshold TH2 is 20 MHz or 100 MHz.

In example 5, the resource allocation method includes the step below.

A PRACH resource is configured for a RedCap UE, where the PRACH resource includes at least one of: a time-frequency resource occupied by a PRACH or a random access preamble sent on a time-frequency resource occupied by a PRACH.

According to characteristics of RedCap UEs, the RedCap UEs are divided into two sets, which are a RedCap UE in a first set, which satisfies one receive antenna and has an antenna size limitation or a device size limitation; and a RedCap UE in a second set, which satisfies two receive antennas and has no antenna size limitation or no device size limitation, respectively.

The PRACH resource includes two sets of PRACH resource configurations for the RedCap UEs in the two sets, respectively.

The PRACH resource includes two sets of PRACH resource configurations, including a first set of PRACH resource configurations configured for the RedCap UE in the first set; and a second set of PRACH resource configurations configured for the RedCap UE in the second set.

The second set of PRACH resource configurations includes at least one of the following: a dedicated PRACH resource configuration for the RedCap UE in the second set; when a bandwidth of an uplink BWP configured for an NR UE is less than or equal to a threshold TH1 (TH1 being greater than or equal to 0), the RedCap UE in the second set uses a PRACH resource configured for the NR UE or a PRACH resource configured for an NR UE that supports or enables a coverage enhancement function, for example, the threshold TH1 is 20 MHz or 100 MHz; or when a bandwidth of an uplink BWP configured for an NR UE is greater than a threshold TH2 (TH2 being greater than or equal to 0), the RedCap UE in the second set uses the first set of PRACH resource configurations or the dedicated PRACH resource configuration for the RedCap UE in the second set, for example, the threshold TH2 is 20 MHz or 100 MHz.

In example 6, the resource allocation method includes the step below.

A PRACH resource is configured for a RedCap UE, where the PRACH resource includes at least one of: a time-frequency resource occupied by a PRACH or a random access preamble sent on a time-frequency resource occupied by a PRACH.

According to characteristics of RedCap UEs, the RedCap UEs are divided into three sets, which are a RedCap UE in a first set, which satisfies one receive antenna and has an antenna size limitation or a device size limitation; a RedCap UE in a second set, which satisfies two receive antennas and has no antenna size limitation or no device size limitation; and a RedCap UE in a third set, which satisfies two receive antennas and has an antenna size limitation or a device size limitation, respectively.

The PRACH resource includes three sets of PRACH resource configurations for the RedCap UEs in the three sets, respectively.

The PRACH resource includes three sets of PRACH resource configurations, including a first set of PRACH resource configurations configured for the RedCap UE in the first set; a second set of PRACH resource configurations configured for the RedCap UE in the third set, where the second set of PRACH resource configurations is a PRACH resource configured for an NR UE or a PRACH resource configured for an NR UE that supports or enables a coverage enhancement function; and a third set of PRACH resource configurations configured for the RedCap UE in the second set.

The third set of PRACH resource configurations includes at least one of the following: a dedicated PRACH resource configuration for the RedCap UE in the second set; when a bandwidth of an uplink BWP configured for the NR UE is less than or equal to a threshold TH1 (TH1 being greater than or equal to 0), the RedCap UE in the second set uses the second set of PRACH resource configurations, for example, the threshold TH1 is 20 MHz or 100 MHz; or when a bandwidth of an uplink BWP configured for the NR UE is greater than a threshold TH2 (TH2 being greater than or equal to 0), the RedCap UE in the second set uses the first set of PRACH resource configurations or the dedicated PRACH resource configuration for the RedCap UE in the second set, for example, the threshold TH2 is 20 MHz or 100 MHz.

In examples 1 to 6, when a PRACH resource in one set of PRACH resource configurations is used by at least two types of RedCap UEs or at least two sets of RedCap UEs, a RedCap UE type or a RedCap UE set is indicated by an Msg3 message in a random access procedure.

For example, if the RedCap UE in the first set and the RedCap UE in the second set in example 3 share one set of PRACH resources, whether the RedCap UE is the RedCap UE in the first set or the RedCap UE in the second set is indicated by 1 bit carried in Msg3.

For example, if the RedCap UE and the NR UE that enables the coverage enhancement function share one set of PRACH resources, whether a UE is the NR UE that enables the coverage enhancement function or the RedCap UE is indicated by 1 bit carried in Msg3.

For example, if two types of RedCap UEs and the NR UE that enables the coverage enhancement function share one set of PRACH resources, whether the UE is the NR UE that enables the coverage enhancement function or one type of RedCap UE is indicated by 2 bits carried in Msg3.

For example, if two types of RedCap UEs and two types of NR UEs that enable the coverage enhancement function share one set of PRACH resources, a type of the UE is indicated by 2 bits carried in Msg3.

For example, if three types of RedCap UEs share one set of PRACH resources, a type of the RedCap UE is indicated by 2 bits carried in Msg3.

In the above examples, "when . . . " may be understood as satisfying a determination condition or satisfying a case or satisfying a state and is equivalent to "in the case where . . . " and not used for limiting the time when the determination condition, the case, or the state is satisfied.

Figure 13:
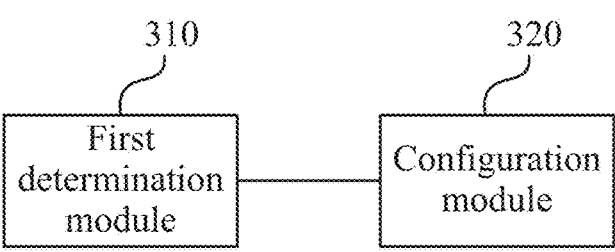
FIG. 13 is a structure diagram of a bandwidth configuration apparatus according to an embodiment.

An embodiment of the present application further provides a bandwidth configuration apparatus. FIG. 13 is a structure diagram of a bandwidth configuration apparatus according to an embodiment. As shown in FIG. 13, the bandwidth configuration apparatus includes a first determination module 310 and a configuration module 320.

The first determination module 310 is configured to determine a first initial uplink bandwidth part, where the first initial uplink bandwidth part includes a random access channel resource, the random access channel resource includes at least one random access channel occasion, and the at least one random access channel occasion is used for transmitting a random access preamble. The configuration module 320 is configured to configure a second initial uplink bandwidth part for a first type of UE, where a bandwidth of the second initial uplink bandwidth part is smaller than a bandwidth of the first initial uplink bandwidth part.

According to the bandwidth configuration apparatus in this embodiment, based on the first initial uplink bandwidth part, the second initial uplink bandwidth part is configured for the first type of UE, and the bandwidth of the second initial uplink bandwidth part is relatively small, thereby ensuring that the first type of UE can normally operate in the second initial uplink bandwidth part, ensuring that the first type of UE supports sending the random access preamble by using a frequency domain resource in the second initial uplink bandwidth part, and ensuring the reliability of an initial access procedure.

In an embodiment, the bandwidth of the second initial uplink bandwidth part is configured by a network side; or the bandwidth of the second initial uplink bandwidth part is a maximum bandwidth configuration value corresponding to the first type of UE in an operating frequency band.

In an embodiment, the second initial uplink bandwidth part includes the random access channel resource.

In an embodiment, a starting PRB of the second initial uplink bandwidth part is the same as a starting PRB of the random access channel resource.

In an embodiment, a PRB of the random access channel resource corresponds to a first subcarrier spacing, and a PRB of the second initial uplink bandwidth part corresponds to a second subcarrier spacing, where in the case where the first subcarrier spacing is different from the second subcarrier spacing, the starting PRB of the second initial uplink bandwidth part is a PRB including the starting PRB of the random access channel resource and having the second subcarrier spacing.

In an embodiment, in the case where a first condition is satisfied, the starting PRB of the second initial uplink bandwidth part is the same as a starting PRB of the first initial uplink bandwidth part or a starting frequency domain position of the second initial uplink bandwidth part is the same as a starting frequency domain position of the first initial uplink bandwidth part; where the first condition includes at least one of the conditions below.

A sum of a bandwidth of the random access channel resource and an offset of the starting PRB of the random access channel resource relative to the starting PRB of the first initial uplink bandwidth part is less than or equal to the maximum bandwidth configuration value corresponding to the first type of UE in the operating frequency band. A sum of a bandwidth of the random access channel resource and an offset of the starting PRB of the random access channel resource relative to the starting PRB of the first initial uplink bandwidth part is less than or equal to the bandwidth of the second initial uplink bandwidth part. A frequency domain bandwidth between an ending PRB of the random access channel resource and the starting PRB of the first initial uplink bandwidth part is less than or equal to the maximum bandwidth configuration value corresponding to the first type of UE in the operating frequency band. A frequency domain bandwidth between an ending PRB of the random access channel resource and the starting PRB of the first initial uplink bandwidth part is less than or equal to the bandwidth of the second initial uplink bandwidth part. The offset of the starting PRB of the random access channel resource relative to the starting PRB of the first initial uplink bandwidth part is indicated by N1 PRBs, where N1 is an integer greater than or equal to 0.

In an embodiment, in the case where a second condition is satisfied, an ending PRB of the second initial uplink bandwidth part is the same as an ending PRB of the first initial uplink bandwidth part or an ending frequency domain position of the second initial uplink bandwidth part is the same as an ending frequency domain position of the first initial uplink bandwidth part; where the second condition includes at least one of the conditions below.

A sum of the bandwidth of the random access channel resource and an offset of the ending PRB of the random access channel resource relative to the ending PRB of the first initial uplink bandwidth part is less than or equal to the maximum bandwidth configuration value corresponding to the first type of UE in the operating frequency band. A sum of the bandwidth of the random access channel resource and an offset of the ending PRB of the random access channel resource relative to the ending PRB of the first initial uplink bandwidth part is less than or equal to the bandwidth of the second initial uplink bandwidth part. A frequency domain bandwidth between the starting PRB of the random access channel resource and the ending PRB of the first initial uplink bandwidth part is less than or equal to the maximum bandwidth configuration value corresponding to the first type of UE in the operating frequency band. A frequency domain bandwidth between the starting PRB of the random access channel resource and the ending PRB of the first initial uplink bandwidth part is less than or equal to the bandwidth of the second initial uplink bandwidth part. The offset of the ending PRB of the random access channel resource relative to the ending PRB of the first initial uplink bandwidth part is indicated by N2 PRBs, where N2 is an integer greater than or equal to 0.

In an embodiment, the second initial uplink bandwidth part includes one or more RBGs, and each RBG includes n PRBs, where n is a positive integer. A value of n is determined according to the bandwidth of the first initial uplink bandwidth part, configured by the network side, or a default value.

In an embodiment, the RBG is used for a frequency domain resource configuration of the first initial uplink bandwidth part.

In an embodiment, a starting RBG of the second initial uplink bandwidth part includes the starting PRB of the random access channel resource.

In an embodiment, in the case where the first condition is satisfied, a starting PRB in the starting RBG of the second initial uplink bandwidth part is the same as the starting PRB of the first initial uplink bandwidth part or the starting frequency domain position of the second initial uplink bandwidth part is the same as the starting frequency domain position of the first initial uplink bandwidth part; where the first condition includes at least one of the conditions below.

The sum of the bandwidth of the random access channel resource and the offset of the starting PRB of the random access channel resource relative to the starting PRB of the first initial uplink bandwidth part is less than or equal to the maximum bandwidth configuration value corresponding to the first type of UE in the operating frequency band. The sum of the bandwidth of the random access channel resource and the offset of the starting PRB of the random access channel resource relative to the starting PRB of the first initial uplink bandwidth part is less than or equal to the bandwidth of the second initial uplink bandwidth part. The frequency domain bandwidth between the ending PRB of the random access channel resource and the starting PRB of the first initial uplink bandwidth part is less than or equal to the maximum bandwidth configuration value corresponding to the first type of UE in the operating frequency band. The frequency domain bandwidth between the ending PRB of the random access channel resource and the starting PRB of the first initial uplink bandwidth part is less than or equal to the bandwidth of the second initial uplink bandwidth part. The offset of the starting PRB of the random access channel resource relative to the starting PRB of the first initial uplink bandwidth part is indicated by the N1 PRBs, where N1 is an integer greater than or equal to 0.

In an embodiment, in the case where the second condition is satisfied, an ending PRB in an ending RBG of the second initial uplink bandwidth part is the same as the ending PRB of the first initial uplink bandwidth part or the ending frequency domain position of the second initial uplink bandwidth part is the same as the ending frequency domain position of the first initial uplink bandwidth part; where the second condition includes at least one of the conditions below.

The sum of the bandwidth of the random access channel resource and the offset of the ending PRB of the random access channel resource relative to the ending PRB of the first initial uplink bandwidth part is less than or equal to the maximum bandwidth configuration value corresponding to the first type of UE in the operating frequency band. The sum of the bandwidth of the random access channel resource and the offset of the ending PRB of the random access channel resource relative to the ending PRB of the first initial uplink bandwidth part is less than or equal to the bandwidth of the second initial uplink bandwidth part. The frequency domain bandwidth between the starting PRB of the random access channel resource and the ending PRB of the first initial uplink bandwidth part is less than or equal to the maximum bandwidth configuration value corresponding to the first type of UE in the operating frequency band. The frequency domain bandwidth between the starting PRB of the random access channel resource and the ending PRB of the first initial uplink bandwidth part is less than or equal to the bandwidth of the second initial uplink bandwidth part. The offset of the ending PRB of the random access channel resource relative to the ending PRB of the first initial uplink bandwidth part is indicated by the N2 PRBs, where N2 is an integer greater than or equal to 0.

In an embodiment, the random access channel resource includes a first part of random access channel occasions and a second part of random access channel occasions.

In an embodiment, the second initial uplink bandwidth part includes a first bandwidth part and a second bandwidth part, where the first bandwidth part includes the first part of random access channel occasions in the random access channel resource, and the second bandwidth part includes the second part of random access channel occasions in the random access channel resource.

In an embodiment, a boundary between the first bandwidth part and the second bandwidth part is an ending PRB of the first part of random access channel occasions.

In an embodiment, a frequency domain bandwidth between a starting PRB of the first bandwidth part and the boundary is less than or equal to a bandwidth between the starting PRB of the first initial uplink bandwidth part and the ending PRB of the first part of random access channel occasions.

In an embodiment, a frequency domain bandwidth between an ending PRB of the second bandwidth part and the boundary is less than or equal to a bandwidth between the ending PRB of the first initial uplink bandwidth part and a starting PRB of the second part of random access channel occasions.

In an embodiment, in the case where a third condition is satisfied, the starting PRB of the first bandwidth part is the same as the starting PRB of the first initial uplink bandwidth part or a starting frequency domain position of the first bandwidth part is the same as the starting frequency domain position of the first initial uplink bandwidth part; where the third condition includes at least one of the conditions below.

A sum of a bandwidth of the first part of random access channel occasions and an offset of a starting PRB of the first part of random access channel occasions relative to the starting PRB of the first initial uplink bandwidth part is less than or equal to the maximum bandwidth configuration value corresponding to the first type of UE in the operating frequency band. A sum of a bandwidth of the first part of random access channel occasions and an offset of a starting PRB of the first part of random access channel occasions relative to the starting PRB of the first initial uplink bandwidth part is less than or equal to the bandwidth of the second initial uplink bandwidth part. A frequency domain bandwidth between a starting PRB of the first part of random access channel occasions and the ending PRB of the first initial uplink bandwidth part is less than or equal to the maximum bandwidth configuration value corresponding to the first type of UE in the operating frequency band. A frequency domain bandwidth between a starting PRB of the first part of random access channel occasions and the ending PRB of the first initial uplink bandwidth part is less than or equal to the bandwidth of the second initial uplink bandwidth part. The offset of the starting PRB of the first part of random access channel occasions relative to the starting PRB of the first initial uplink bandwidth part is indicated by N3 PRBs, where N3 is an integer greater than or equal to 0.

In an embodiment, in the case where a fourth condition is satisfied, the ending PRB of the second bandwidth part is the same as the ending PRB of the first initial uplink bandwidth part or an ending frequency domain position of the second bandwidth part is the same as the ending frequency domain position of the first initial uplink bandwidth part; where the fourth condition includes at least one of the conditions below.

A sum of a bandwidth of the second part of random access channel occasions and an offset of an ending PRB of the second part of random access channel occasions relative to the ending PRB of the first initial uplink bandwidth part is less than or equal to the maximum bandwidth configuration value corresponding to the first type of UE in the operating frequency band. A sum of a bandwidth of the second part of random access channel occasions and an offset of an ending PRB of the second part of random access channel occasions relative to the ending PRB of the first initial uplink bandwidth part is less than or equal to the bandwidth of the second initial uplink bandwidth part. A frequency domain bandwidth between the starting PRB of the second part of random access channel occasions and the ending PRB of the first initial uplink bandwidth part is less than or equal to the maximum bandwidth configuration value corresponding to the first type of UE in the operating frequency band. A frequency domain bandwidth between the starting PRB of the second part of random access channel occasions and the ending PRB of the first initial uplink bandwidth part is less than or equal to the bandwidth of the second initial uplink bandwidth part. The offset of the ending PRB of the second part of random access channel occasions relative to the ending PRB of the first initial uplink bandwidth part is indicated by N4 PRBs, where N4 is an integer greater than or equal to 0.

In an embodiment, a bandwidth of the first bandwidth part is configured by the network side or is the maximum bandwidth configuration value corresponding to the first type of UE in the operating frequency band; and a bandwidth of the second bandwidth part is configured by the network side or is the maximum bandwidth configuration value corresponding to the first type of UE in the operating frequency band.

In an embodiment, the operating frequency band of the first type of UE includes a first frequency band and a second frequency band; a maximum bandwidth configuration value corresponding to the first type of UE in the first frequency band is 20 MHz; and a maximum bandwidth configuration value corresponding to the first type of UE in the second frequency band is 100 MHz.

In an embodiment, the random access channel resource satisfies one of the following: the number of frequency-division multiplexed resources is 1, 2, or 4; the number of frequency-division multiplexed resources is 8, and a format of a physical random access channel is a format a format 1, or a format 2; the number of frequency-division multiplexed resources is 8, a format of a physical random access channel corresponds to a short preamble, and a subcarrier spacing is kHz; or the number of frequency-division multiplexed resources is 8, a format of a physical random access channel corresponds to a short preamble, and a subcarrier spacing is 60 kHz.

In an embodiment, the random access channel resource satisfies one of the following: the number of frequency-division multiplexed resources is 8, and the format of the physical random access channel is a format 3; the number of frequency-division multiplexed resources is 8, the format of the physical random access channel corresponds to the short preamble, and the subcarrier spacing is 30 kHz; or the number of frequency-division multiplexed resources is 8, the format of the physical random access channel corresponds to the short preamble, and the subcarrier spacing is 120 kHz.

In an embodiment, the apparatus further includes a first frequency domain resource determination module.

The first frequency domain resource determination module is configured to determine a frequency domain resource occupied by the second initial uplink bandwidth part according to at least one of: the number of random access channel occasions in the random access channel resource; a frequency domain bandwidth corresponding to the random access channel resource; a starting frequency domain position of the random access channel resource; an ending frequency domain position of the random access channel resource; the starting frequency domain position of the first initial uplink bandwidth part; the ending frequency domain position of the first initial uplink bandwidth part; the bandwidth of the first initial uplink bandwidth part; or the bandwidth of the second initial uplink bandwidth part.

In an embodiment, in the case where a fifth condition is satisfied, the starting PRB or the starting RBG of the second initial uplink bandwidth part is the starting PRB or a starting RBG of the first initial uplink bandwidth part; where the fifth condition includes the condition below.

A frequency domain bandwidth between the ending frequency domain position of the random access channel resource and the starting frequency domain position of the first initial uplink bandwidth part is less than or equal to the bandwidth of the second initial uplink bandwidth part.

In an embodiment, in the case where a sixth condition is satisfied, the ending PRB or the ending RBG of the second initial uplink bandwidth part is the ending PRB or an ending RBG of the first initial uplink bandwidth part; where the sixth condition includes the condition below.

A frequency domain bandwidth between the starting frequency domain position of the random access channel resource and the ending frequency domain position of the first initial uplink bandwidth part is less than or equal to the bandwidth of the second initial uplink bandwidth part.

In an embodiment, in the case where a seventh condition is satisfied, the starting PRB or the starting RBG of the second initial uplink bandwidth part is a PRB or a starting RBG including the starting frequency domain position of the random access channel resource; where the seventh condition includes at least one of the conditions below.

The frequency domain bandwidth between the ending frequency domain position of the random access channel resource and the starting frequency domain position of the first initial uplink bandwidth part is greater than the bandwidth of the second initial uplink bandwidth part. The frequency domain bandwidth between the starting frequency domain position of the random access channel resource and the ending frequency domain position of the first initial uplink bandwidth part is greater than the bandwidth of the second initial uplink bandwidth part.

In an embodiment, in the case where an eighth condition is satisfied, the ending PRB or the starting RBG of the second initial uplink bandwidth part is a PRB or a starting RBG including the ending frequency domain position of the random access channel resource; where the eighth condition includes at least one of the conditions below.

The frequency domain bandwidth between the ending frequency domain position of the random access channel resource and the starting frequency domain position of the first initial uplink bandwidth part is greater than the bandwidth of the second initial uplink bandwidth part. The frequency domain bandwidth between the starting frequency domain position of the random access channel resource and the ending frequency domain position of the first initial uplink bandwidth part is greater than the bandwidth of the second initial uplink bandwidth part.

In an embodiment, the configuration module 320 is configured to, in the case where the number of random access channel occasions in the random access channel resource is greater than or equal to a determined value T or in the case where the frequency domain bandwidth corresponding to the random access channel resource is greater than or equal to a determined value N, configure two second initial uplink bandwidth parts.

In an embodiment, in the case where a ninth condition is satisfied, a starting PRB or a starting RBG of one second initial uplink bandwidth part of the two second initial uplink bandwidth parts is the starting PRB or the starting RBG of the first initial uplink bandwidth part; where the ninth condition includes the condition below.

A frequency domain bandwidth between a sum of frequency domain bandwidths corresponding to random access channel occasions whose indexes are less than or equal to a determined value D and the starting frequency domain position of the first initial uplink bandwidth part is less than or equal to the bandwidth of the second initial uplink bandwidth part.

In an embodiment, an ending PRB or an ending RBG of the one second initial uplink bandwidth part is a PRB or an ending RBG corresponding to an ending frequency domain position of a random access channel occasion with an index of D.

In an embodiment, a starting PRB or a starting RBG of the other second initial uplink bandwidth part of the two second initial uplink bandwidth parts is a PRB or a starting RBG corresponding to a starting frequency domain position of a random access channel occasion with an index of D+1.

In an embodiment, in the case where a tenth condition is satisfied, an ending PRB or an ending RBG of one second initial uplink bandwidth part of the two second initial uplink bandwidth parts is the ending PRB or the ending RBG of the first initial uplink bandwidth part; where the tenth condition includes the condition below.

A frequency domain bandwidth between a sum of frequency domain bandwidths corresponding to random access channel occasions whose indexes are greater than or equal to a determined value E and the ending frequency domain position of the first initial uplink bandwidth part is less than or equal to the bandwidth of the second initial uplink bandwidth part.

In an embodiment, the starting PRB or the starting RBG of the one second initial uplink bandwidth part is a PRB or a starting RBG corresponding to a starting frequency domain position of a random access channel occasion with an index of E.

In an embodiment, the ending PRB or the ending RBG of the other second initial uplink bandwidth part of the two second initial uplink bandwidth parts is a PRB or an ending RBG corresponding to an ending frequency domain position of a random access channel occasion with an index of E−1.

In an embodiment, the two second initial uplink bandwidth parts are consecutive in frequency domain, and a frequency domain boundary between the two second initial uplink bandwidth parts is a PRB or an RBG corresponding to an ending frequency domain position of a determined random access channel occasion.

The bandwidth configuration apparatus provided in this embodiment and the bandwidth configuration method provided in the preceding embodiment belong to the same concept. For technical details not described in detail in this embodiment, reference may be made to any one of the preceding embodiments, and this embodiment has the same effects as the bandwidth configuration method performed.

Figure 14:
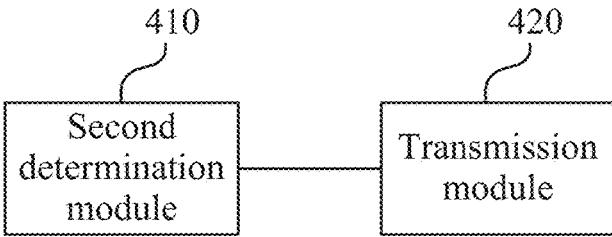
FIG. 14 is a structure diagram of a transmission apparatus according to an embodiment.

An embodiment of the present application further provides a transmission apparatus. FIG. 14 is a structure diagram of a transmission apparatus according to an embodiment. As shown in FIG. 14, the transmission apparatus includes a second determination module 410 and a transmission module 420.

The second determination module 410 is configured to determine a second initial uplink bandwidth part, where a bandwidth of the second initial uplink bandwidth part is smaller than a bandwidth of a first initial uplink bandwidth part, the first initial uplink bandwidth part includes a random access channel resource, the random access channel resource includes at least one random access channel occasion, and the at least one random access channel occasion is used for transmitting a random access preamble. The transmission module 420 is configured to transmit the random access preamble through a frequency domain resource in the second initial uplink bandwidth part.

According to the bandwidth configuration apparatus in this embodiment, a first type of UE sends the random access preamble by using the frequency domain resource in the second initial uplink bandwidth part, and the bandwidth of the second initial uplink bandwidth part is relatively small, thereby ensuring that the first type of UE successfully sends the random access preamble and improving the reliability of an initial access procedure.

In an embodiment, the bandwidth of the second initial uplink bandwidth part is configured by a network side; or the bandwidth of the second initial uplink bandwidth part is a maximum bandwidth configuration value corresponding to the first type of UE in an operating frequency band.

In an embodiment, the second initial uplink bandwidth part includes the random access channel resource.

In an embodiment, a starting PRB of the second initial uplink bandwidth part is the same as a starting PRB of the random access channel resource.

In an embodiment, a PRB of the random access channel resource corresponds to a first subcarrier spacing, and a PRB of the second initial uplink bandwidth part corresponds to a second subcarrier spacing, where in the case where the first subcarrier spacing is different from the second subcarrier spacing, the starting PRB of the second initial uplink bandwidth part is a PRB including the starting PRB of the random access channel resource and having the second subcarrier spacing.

In an embodiment, in the case where a first condition is satisfied, the starting PRB of the second initial uplink bandwidth part is the same as a starting PRB of the first initial uplink bandwidth part or a starting frequency domain position of the second initial uplink bandwidth part is the same as a starting frequency domain position of the first initial uplink bandwidth part; where the first condition includes at least one of the conditions below.

A sum of a bandwidth of the random access channel resource and an offset of the starting PRB of the random access channel resource relative to the starting PRB of the first initial uplink bandwidth part is less than or equal to the maximum bandwidth configuration value corresponding to the first type of UE in the operating frequency band. A sum of a bandwidth of the random access channel resource and an offset of the starting PRB of the random access channel resource relative to the starting PRB of the first initial uplink bandwidth part is less than or equal to the bandwidth of the second initial uplink bandwidth part. A frequency domain bandwidth between an ending PRB of the random access channel resource and the starting PRB of the first initial uplink bandwidth part is less than or equal to the maximum bandwidth configuration value corresponding to the first type of UE in the operating frequency band. A frequency domain bandwidth between an ending PRB of the random access channel resource and the starting PRB of the first initial uplink bandwidth part is less than or equal to the bandwidth of the second initial uplink bandwidth part. The offset of the starting PRB of the random access channel resource relative to the starting PRB of the first initial uplink bandwidth part is indicated by N1 PRBs, where N1 is an integer greater than or equal to 0.

In an embodiment, in the case where a second condition is satisfied, an ending PRB of the second initial uplink bandwidth part is the same as an ending PRB of the first initial uplink bandwidth part or an ending frequency domain position of the second initial uplink bandwidth part is the same as an ending frequency domain position of the first initial uplink bandwidth part; where the second condition includes at least one of the conditions below.

A sum of the bandwidth of the random access channel resource and an offset of the ending PRB of the random access channel resource relative to the ending PRB of the first initial uplink bandwidth part is less than or equal to the maximum bandwidth configuration value corresponding to the first type of UE in the operating frequency band. A sum of the bandwidth of the random access channel resource and an offset of the ending PRB of the random access channel resource relative to the ending PRB of the first initial uplink bandwidth part is less than or equal to the bandwidth of the second initial uplink bandwidth part. A frequency domain bandwidth between the starting PRB of the random access channel resource and the ending PRB of the first initial uplink bandwidth part is less than or equal to the maximum bandwidth configuration value corresponding to the first type of UE in the operating frequency band. A frequency domain bandwidth between the starting PRB of the random access channel resource and the ending PRB of the first initial uplink bandwidth part is less than or equal to the bandwidth of the second initial uplink bandwidth part. The offset of the ending PRB of the random access channel resource relative to the ending PRB of the first initial uplink bandwidth part is indicated by N2 PRBs, where N2 is an integer greater than or equal to 0.

In an embodiment, the second initial uplink bandwidth part includes one or more RBGs, and each RBG includes n PRBs, where n is a positive integer. A value of n is determined according to the bandwidth of the first initial uplink bandwidth part, configured by the network side, or a default value.

In an embodiment, the RBG is used for a frequency domain resource configuration of the first initial uplink bandwidth part.

In an embodiment, a starting RBG of the second initial uplink bandwidth part includes the starting PRB of the random access channel resource.

In an embodiment, in the case where the first condition is satisfied, a starting PRB in the starting RBG of the second initial uplink bandwidth part is the same as the starting PRB of the first initial uplink bandwidth part or the starting frequency domain position of the second initial uplink bandwidth part is the same as the starting frequency domain position of the first initial uplink bandwidth part; where the first condition includes at least one of the conditions below.

The sum of the bandwidth of the random access channel resource and the offset of the starting PRB of the random access channel resource relative to the starting PRB of the first initial uplink bandwidth part is less than or equal to the maximum bandwidth configuration value corresponding to the first type of UE in the operating frequency band. The sum of the bandwidth of the random access channel resource and the offset of the starting PRB of the random access channel resource relative to the starting PRB of the first initial uplink bandwidth part is less than or equal to the bandwidth of the second initial uplink bandwidth part. The frequency domain bandwidth between the ending PRB of the random access channel resource and the starting PRB of the first initial uplink bandwidth part is less than or equal to the maximum bandwidth configuration value corresponding to the first type of UE in the operating frequency band. The frequency domain bandwidth between the ending PRB of the random access channel resource and the starting PRB of the first initial uplink bandwidth part is less than or equal to the bandwidth of the second initial uplink bandwidth part. The offset of the starting PRB of the random access channel resource relative to the starting PRB of the first initial uplink bandwidth part is indicated by the N1 PRBs, where N1 is an integer greater than or equal to 0.

In an embodiment, in the case where the second condition is satisfied, an ending PRB in an ending RB G of the second initial uplink bandwidth part is the same as the ending PRB of the first initial uplink bandwidth part or the ending frequency domain position of the second initial uplink bandwidth part is the same as the ending frequency domain position of the first initial uplink bandwidth part; where the second condition includes at least one of the conditions below.

The sum of the bandwidth of the random access channel resource and the offset of the ending PRB of the random access channel resource relative to the ending PRB of the first initial uplink bandwidth part is less than or equal to the maximum bandwidth configuration value corresponding to the first type of UE in the operating frequency band. The sum of the bandwidth of the random access channel resource and the offset of the ending PRB of the random access channel resource relative to the ending PRB of the first initial uplink bandwidth part is less than or equal to the bandwidth of the second initial uplink bandwidth part. The frequency domain bandwidth between the starting PRB of the random access channel resource and the ending PRB of the first initial uplink bandwidth part is less than or equal to the maximum bandwidth configuration value corresponding to the first type of UE in the operating frequency band. The frequency domain bandwidth between the starting PRB of the random access channel resource and the ending PRB of the first initial uplink bandwidth part is less than or equal to the bandwidth of the second initial uplink bandwidth part. The offset of the ending PRB of the random access channel resource relative to the ending PRB of the first initial uplink bandwidth part is indicated by the N2 PRBs, where N2 is an integer greater than or equal to 0.

In an embodiment, the random access channel resource includes a first part of random access channel occasions and a second part of random access channel occasions.

In an embodiment, the second initial uplink bandwidth part includes a first bandwidth part and a second bandwidth part, where the first bandwidth part includes the first part of random access channel occasions in the random access channel resource, and the second bandwidth part includes the second part of random access channel occasions in the random access channel resource.

In an embodiment, a boundary between the first bandwidth part and the second bandwidth part is an ending PRB of the first part of random access channel occasions.

In an embodiment, a frequency domain bandwidth between a starting PRB of the first bandwidth part and the boundary is less than or equal to a bandwidth between the starting PRB of the first initial uplink bandwidth part and the ending PRB of the first part of random access channel occasions.

In an embodiment, a frequency domain bandwidth between an ending PRB of the second bandwidth part and the boundary is less than or equal to a bandwidth between the ending PRB of the first initial uplink bandwidth part and a starting PRB of the second part of random access channel occasions.

In an embodiment, in the case where a third condition is satisfied, the starting PRB of the first bandwidth part is the same as the starting PRB of the first initial uplink bandwidth part or a starting frequency domain position of the first bandwidth part is the same as the starting frequency domain position of the first initial uplink bandwidth part; where the third condition includes at least one of the conditions below.

A sum of a bandwidth of the first part of random access channel occasions and an offset of a starting PRB of the first part of random access channel occasions relative to the starting PRB of the first initial uplink bandwidth part is less than or equal to the maximum bandwidth configuration value corresponding to the first type of UE in the operating frequency band. A sum of a bandwidth of the first part of random access channel occasions and an offset of a starting PRB of the first part of random access channel occasions relative to the starting PRB of the first initial uplink bandwidth part is less than or equal to the bandwidth of the second initial uplink bandwidth part. A frequency domain bandwidth between a starting PRB of the first part of random access channel occasions and the ending PRB of the first initial uplink bandwidth part is less than or equal to the maximum bandwidth configuration value corresponding to the first type of UE in the operating frequency band. A frequency domain bandwidth between a starting PRB of the first part of random access channel occasions and the ending PRB of the first initial uplink bandwidth part is less than or equal to the bandwidth of the second initial uplink bandwidth part. The offset of the starting PRB of the first part of random access channel occasions relative to the starting PRB of the first initial uplink bandwidth part is indicated by N3 PRBs, where N3 is an integer greater than or equal to 0.

In an embodiment, in the case where a fourth condition is satisfied, the ending PRB of the second bandwidth part is the same as the ending PRB of the first initial uplink bandwidth part or an ending frequency domain position of the second bandwidth part is the same as the ending frequency domain position of the first initial uplink bandwidth part; where the fourth condition includes at least one of the conditions below.

A sum of a bandwidth of the second part of random access channel occasions and an offset of an ending PRB of the second part of random access channel occasions relative to the ending PRB of the first initial uplink bandwidth part is less than or equal to the maximum bandwidth configuration value corresponding to the first type of UE in the operating frequency band. A sum of a bandwidth of the second part of random access channel occasions and an offset of an ending PRB of the second part of random access channel occasions relative to the ending PRB of the first initial uplink bandwidth part is less than or equal to the bandwidth of the second initial uplink bandwidth part. A frequency domain bandwidth between the starting PRB of the second part of random access channel occasions and the ending PRB of the first initial uplink bandwidth part is less than or equal to the maximum bandwidth configuration value corresponding to the first type of UE in the operating frequency band. A frequency domain bandwidth between the starting PRB of the second part of random access channel occasions and the ending PRB of the first initial uplink bandwidth part is less than or equal to the bandwidth of the second initial uplink bandwidth part. The offset of the ending PRB of the second part of random access channel occasions relative to the ending PRB of the first initial uplink bandwidth part is indicated by N4 PRBs, where N4 is an integer greater than or equal to 0.

In an embodiment, a bandwidth of the first bandwidth part is configured by the network side or is the maximum bandwidth configuration value corresponding to the first type of UE in the operating frequency band; and a bandwidth of the second bandwidth part is configured by the network side or is the maximum bandwidth configuration value corresponding to the first type of UE in the operating frequency band.

In an embodiment, the operating frequency band of the first type of UE includes a first frequency band and a second frequency band; a maximum bandwidth configuration value corresponding to the first type of UE in the first frequency band is 20 MHz; and a maximum bandwidth configuration value corresponding to the first type of UE in the second frequency band is 100 MHz.

In an embodiment, the random access channel resource satisfies one of the following: the number of frequency-division multiplexed resources is 1, 2, or 4; the number of frequency-division multiplexed resources is 8, and a format of a physical random access channel is a format a format 1, or a format 2; the number of frequency-division multiplexed resources is 8, a format of a physical random access channel corresponds to a short preamble, and a subcarrier spacing is kHz; or the number of frequency-division multiplexed resources is 8, a format of a physical random access channel corresponds to a short preamble, and a subcarrier spacing is 60 kHz.

In an embodiment, the random access channel resource satisfies one of the following: the number of frequency-division multiplexed resources is 8, and the format of the physical random access channel is a format 3; the number of frequency-division multiplexed resources is 8, the format of the physical random access channel corresponds to the short preamble, and the subcarrier spacing is 30 kHz; or the number of frequency-division multiplexed resources is 8, the format of the physical random access channel corresponds to the short preamble, and the subcarrier spacing is 120 kHz.

In an embodiment, the apparatus further includes a second frequency domain resource determination module.

The second frequency domain resource determination module is configured to determine a frequency domain resource occupied by the second initial uplink bandwidth part according to at least one of: the number of random access channel occasions in the random access channel resource; a frequency domain bandwidth corresponding to the random access channel resource; a starting frequency domain position of the random access channel resource; an ending frequency domain position of the random access channel resource; the starting frequency domain position of the first initial uplink bandwidth part; the ending frequency domain position of the first initial uplink bandwidth part; the bandwidth of the first initial uplink bandwidth part; or the bandwidth of the second initial uplink bandwidth part.

In an embodiment, in the case where a fifth condition is satisfied, the starting PRB or the starting RBG of the second initial uplink bandwidth part is the starting PRB or a starting RBG of the first initial uplink bandwidth part; where the fifth condition includes the condition below.

A frequency domain bandwidth between the ending frequency domain position of the random access channel resource and the starting frequency domain position of the first initial uplink bandwidth part is less than or equal to the bandwidth of the second initial uplink bandwidth part.

In an embodiment, in the case where a sixth condition is satisfied, the ending PRB or the ending RBG of the second initial uplink bandwidth part is the ending PRB or an ending RBG of the first initial uplink bandwidth part; where the sixth condition includes the condition below.

A frequency domain bandwidth between the starting frequency domain position of the random access channel resource and the ending frequency domain position of the first initial uplink bandwidth part is less than or equal to the bandwidth of the second initial uplink bandwidth part.

In an embodiment, in the case where a seventh condition is satisfied, the starting PRB or the starting RBG of the second initial uplink bandwidth part is a PRB or a starting RBG including the starting frequency domain position of the random access channel resource; where the seventh condition includes at least one of the conditions below.

The frequency domain bandwidth between the ending frequency domain position of the random access channel resource and the starting frequency domain position of the first initial uplink bandwidth part is greater than the bandwidth of the second initial uplink bandwidth part. The frequency domain bandwidth between the starting frequency domain position of the random access channel resource and the ending frequency domain position of the first initial uplink bandwidth part is greater than the bandwidth of the second initial uplink bandwidth part.

In an embodiment, in the case where an eighth condition is satisfied, the ending PRB or the starting RBG of the second initial uplink bandwidth part is a PRB or a starting RBG including the ending frequency domain position of the random access channel resource; where the eighth condition includes at least one of the conditions below.

The frequency domain bandwidth between the ending frequency domain position of the random access channel resource and the starting frequency domain position of the first initial uplink bandwidth part is greater than the bandwidth of the second initial uplink bandwidth part. The frequency domain bandwidth between the starting frequency domain position of the random access channel resource and the ending frequency domain position of the first initial uplink bandwidth part is greater than the bandwidth of the second initial uplink bandwidth part.

In an embodiment, in the case where the number of random access channel occasions in the random access channel resource is greater than or equal to a determined value T or in the case where the frequency domain bandwidth corresponding to the random access channel resource is greater than or equal to a determined value N, two second initial uplink bandwidth parts are configured.

In an embodiment, in the case where a ninth condition is satisfied, a starting PRB or a starting RBG of one second initial uplink bandwidth part of the two second initial uplink bandwidth parts is the starting PRB or the starting RBG of the first initial uplink bandwidth part; where the ninth condition includes the condition below.

A frequency domain bandwidth between a sum of frequency domain bandwidths corresponding to random access channel occasions whose indexes are less than or equal to a determined value D and the starting frequency domain position of the first initial uplink bandwidth part is less than or equal to the bandwidth of the second initial uplink bandwidth part.

In an embodiment, an ending PRB or an ending RBG of the one second initial uplink bandwidth part is a PRB or an ending RBG corresponding to an ending frequency domain position of a random access channel occasion with an index of D.

In an embodiment, a starting PRB or a starting RBG of the other second initial uplink bandwidth part of the two second initial uplink bandwidth parts is a PRB or a starting RBG corresponding to a starting frequency domain position of a random access channel occasion with an index of D+1.

In an embodiment, in the case where a tenth condition is satisfied, an ending PRB or an ending RBG of one second initial uplink bandwidth part of the two second initial uplink bandwidth parts is the ending PRB or the ending RBG of the first initial uplink bandwidth part; where the tenth condition includes the condition below.

A frequency domain bandwidth between a sum of frequency domain bandwidths corresponding to random access channel occasions whose indexes are greater than or equal to a determined value E and the ending frequency domain position of the first initial uplink bandwidth part is less than or equal to the bandwidth of the second initial uplink bandwidth part.

In an embodiment, the starting PRB or the starting RBG of the one second initial uplink bandwidth part is a PRB or a starting RBG corresponding to a starting frequency domain position of a random access channel occasion with an index of E.

In an embodiment, the ending PRB or the ending RBG of the other second initial uplink bandwidth part of the two second initial uplink bandwidth parts is a PRB or an ending RBG corresponding to an ending frequency domain position of a random access channel occasion with an index of E−1.

In an embodiment, the two second initial uplink bandwidth parts are consecutive in frequency domain, and a frequency domain boundary between the two second initial uplink bandwidth parts is a PRB or an RBG corresponding to an ending frequency domain position of a determined random access channel occasion.

The transmission apparatus provided in this embodiment and the transmission method provided in the preceding embodiment belong to the same concept. For technical details not described in detail in this embodiment, reference may be made to any one of the preceding embodiments, and this embodiment has the same effects as the transmission method performed.

Figure 15:
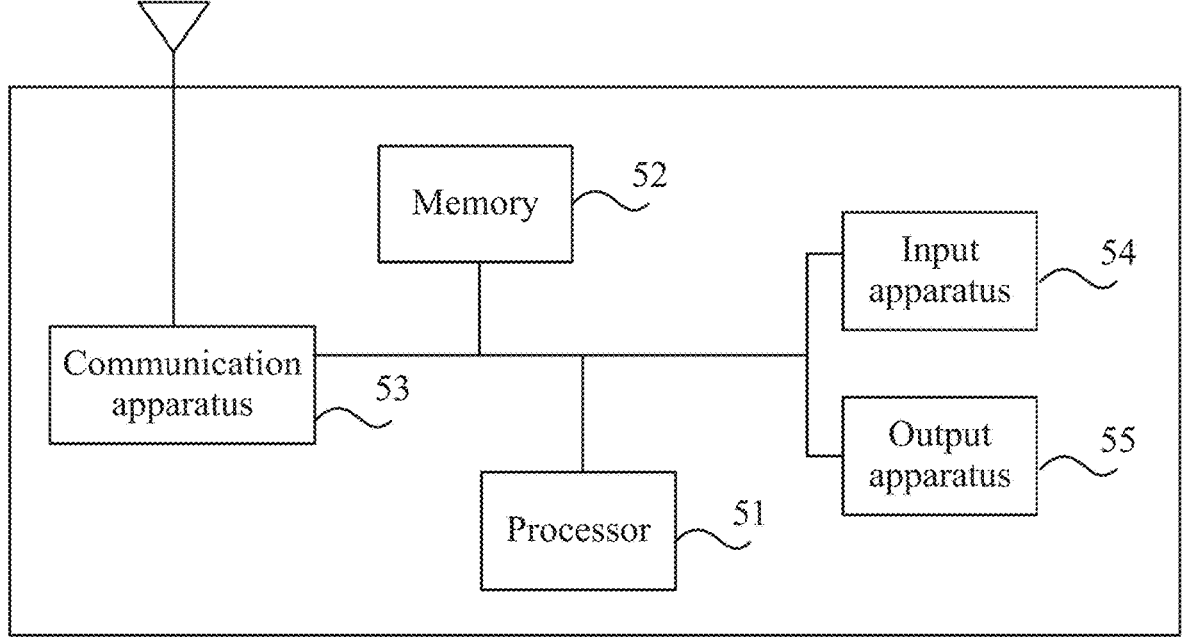
FIG. 15 is a structure diagram of hardware of a communication node according to an embodiment.

An embodiment of the present application further provides a communication node. FIG. 15 is a structure diagram of hardware of a communication node according to an embodiment. As shown in FIG. 15, the communication node provided by the present application includes a memory 52, a processor 51, and a computer program stored in the memory and executable by the processor, where the processor 51 executes the program to perform the preceding bandwidth configuration method.

The communication node may further include the memory 52. One or more processors 51 may be provided in the communication node, and one processor 51 is shown as an example in FIG. 15. The memory 52 is configured to store one or more programs; where the one or more programs are executed by the one or more processors 51 to cause the one or more processors 51 to perform the bandwidth configuration method or the transmission method in the embodiments of the present application.

The communication node further includes a communication apparatus 53, an input apparatus 54, and an output apparatus 55.

The processor 51, the memory 52, the communication apparatus 53, the input apparatus 54, and the output apparatus 55 in the communication node may be connected through a bus or in other manners, and the connection through the bus is shown as an example in FIG. 15.

The input apparatus 54 may be configured to receive inputted digital or character information and generate key signal input related to user settings and function control of the communication node. The output apparatus 55 may include a display device such as a display screen.

The communication apparatus 53 may include a receiver and a sender. The communication apparatus 53 is configured to perform information transceiving communication under the control of the processor 51.

As a non-transitory computer-readable storage medium, the memory 52 may be configured to store software programs, computer-executable programs, and modules, such as program instructions/modules corresponding to the bandwidth configuration method in the embodiments of the present application (for example, the first determination module 310 and the configuration module 320 in the bandwidth configuration apparatus). The memory 52 may include a program storage region and a data storage region, where the program storage region may store an operating system and an application program required by at least one function, and the data storage region may store data and the like created according to the use of the communication node. Additionally, the memory 52 may include a high-speed random-access memory and may also include a nonvolatile memory, such as at least one magnetic disk memory, a flash memory, or another nonvolatile solid-state memory. In some examples, the memory 52 may include memories which are remotely disposed relative to the processor 51, and these remote memories may be connected to the communication node via a network. Examples of the preceding network include, but are not limited to, the Internet, an intranet, a local area network, a mobile communication network, and a combination thereof.

An embodiment of the present application further provides a storage medium. The storage medium stores a computer program which, when executed by a processor, causes the processor to perform the bandwidth configuration method or the transmission method according to any one of the embodiments of the present application.

The bandwidth configuration method includes: determining a first initial uplink bandwidth part, where the first initial uplink bandwidth part includes a random access channel resource, the random access channel resource includes at least one random access channel occasion, and the at least one random access channel occasion is used for transmitting a random access preamble; and configuring a second initial uplink bandwidth part for a first type of UE, where a bandwidth of the second initial uplink bandwidth part is smaller than a bandwidth of the first initial uplink bandwidth part.

The transmission method includes: determining a second initial uplink bandwidth part, where a bandwidth of the second initial uplink bandwidth part is smaller than a bandwidth of a first initial uplink bandwidth part, the first initial uplink bandwidth part includes a random access channel resource, the random access channel resource includes at least one random access channel occasion, and the at least one random access channel occasion is used for transmitting a random access preamble; and transmitting the random access preamble through a frequency domain resource in the second initial uplink bandwidth part.

A computer storage medium in an embodiment of the present application may adopt any combination of one or more computer-readable media. The computer-readable media may be computer-readable signal media or computer-readable storage media. For example, a computer-readable storage medium may be, but is not limited to, an electrical, magnetic, optical, electromagnetic, infrared, or semiconductor system, apparatus, or device or any combination thereof. Examples of the computer-readable storage medium (a non-exhaustive list) include an electrical connection having one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical memory, a magnetic memory, or any suitable combination thereof. The computer-readable storage medium may be any tangible medium including or storing a program.

The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

Program codes included on the computer-readable medium may be transmitted by any suitable medium including, but not limited to, a wireless medium, a wire, an optical cable, a radio frequency (RF), or any suitable combination thereof.

Computer program codes for performing operations of the present application may be written in one or more programming languages or a combination thereof. The programming languages include object-oriented programming languages such as Java, Smalltalk, and C++ and may further include conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network including a local area network (LAN) or a wide area network (WAN), or may be connected to an external computer (for example, via the Internet provided by an Internet service provider).

The preceding illustrates example embodiments of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored on a memory. The memory may be of any type suitable for a local technical environment and may be implemented using any suitable data storage technology, such as, but not limited to, a ROM, a RAM, or an optical memory device and system (for example, a digital video disc (DVD) or a compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A bandwidth configuration method, comprising:
determining a first initial uplink bandwidth part, wherein the first initial uplink bandwidth part has a random access channel resource, the random access channel resource comprises at least one random access channeloccasion, and the at least one random access channel occasion is used for transmitting a random access preamble; and
configuring a second initial uplink bandwidth part for a first type of user equipment (UE), wherein a bandwidth of the second initial uplink bandwidth part is smaller than a bandwidth of the first initial uplink bandwidth part;
wherein the second initial uplink bandwidth part comprises the random access channel resource;
wherein a starting physical resource block of the second initial uplink bandwidth part is the same as a starting physical resource block of the random access channel resource; and
wherein a physical resource block of the random access channel resource corresponds to a first subcarrier spacing, and a physical resource block of the second initial uplink bandwidth part corresponds to a second subcarrier spacing, wherein in a case where the first subcarrier spacing is different from the second subcarrier spacing, a starting physical resource block of the second initial uplink bandwidth part is a physical resource block comprising a starting physical resource block of the random access channel resource and having the second subcarrier spacing.

2. The method of claim 1, wherein in a case where a first condition is satisfied, a starting physical resource block of the second initial uplink bandwidth part is the same as a starting physical resource block of the first initial uplink bandwidth part or a starting frequency domain position of the second initial uplink bandwidth part is the same as a starting frequency domain position of the first initial uplink bandwidth part;
wherein the first condition comprises at least one of the following:
a sum of a bandwidth of the random access channel resource and an offset of a starting physical resource block of the random access channel resource relative to the starting physical resource block of the first initial uplink bandwidth part is less than or equal to a maximum bandwidth configuration value corresponding to the first type of UE in an operating frequency band;
a sum of a bandwidth of the random access channel resource and an offset of a starting physical resource block of the random access channel resource relative to the starting physical resource block of the first initial uplink bandwidth part is less than or equal to the bandwidth of the second initial uplink bandwidth part;
a frequency domain bandwidth between an ending physical resource block of the random access channel resource and the starting physical resource block of the first initial uplink bandwidth part is less than or equal to a maximum bandwidth configuration value corresponding to the first type of UE in an operating frequency band; or a frequency domain bandwidth between an ending physical resource block of the random access channel resource and the starting physical resource block of the first initial uplink bandwidth part is less than or equal to the bandwidth of the second initial uplink bandwidth part;

wherein the offset of the starting physical resource block of the random access channel resource relative to the starting physical resource block of the first initial uplink bandwidth part is indicated by N1 physical resource blocks, wherein N1 is an integer greater than or equal to 0.

3. The method of claim 1, wherein in a case where a second condition is satisfied, an ending physical resource block of the second initial uplink bandwidth part is the same as an ending physical resource block of the first initial uplink bandwidth part or an ending frequency domain position of the second initial uplink bandwidth part is the same as an ending frequency domain position of the first initial uplink bandwidth part;

wherein the second condition comprises at least one of the following:

a sum of a bandwidth of the random access channel resource and an offset of an ending physical resource block of the random access channel resource relative to the ending physical resource block of the first initial uplink bandwidth part is less than or equal to a maximum bandwidth configuration value corresponding to the first type of UE in an operating frequency band;

a sum of a bandwidth of the random access channel resource and an offset of an ending physical resource block of the random access channel resource relative to the ending physical resource block of the first initial uplink bandwidth part is less than or equal to the bandwidth of the second initial uplink bandwidth part;

a frequency domain bandwidth between a starting physical resource block of the random access channel resource and the ending physical resource block of the first initial uplink bandwidth part is less than or equal to a maximum bandwidth configuration value corresponding to the first type of UE in an operating frequency band; or a frequency domain bandwidth between a starting physical resource block of the random access channel resource and the ending physical resource block of the first initial uplink bandwidth part is less than or equal to the bandwidth of the second initial uplink bandwidth part;

wherein the offset of the ending physical resource block of the random access channel resource relative to the ending physical resource block of the first initial uplink bandwidth part is indicated by N2 physical resource blocks, wherein N2 is an integer greater than or equal to 0.

4. The method of claim 1, wherein the second initial uplink bandwidth part comprises one or more resource block groups, and each resource block group of the one or more resource block groups comprises n physical resource blocks, wherein n is a positive integer; and a value of n is determined according to the bandwidth of the first initial uplink bandwidth part, is configured by a network side, or is a default value;

wherein the resource block group is used for a frequency domain resource configuration of the first initial uplink bandwidth part; or wherein a starting resource block group of the second initial uplink bandwidth part comprises a starting physical resource block of the random access channel resource.

5. The method of claim 4, wherein in a case where a first condition is satisfied, a starting physical resource block in a starting resource block group of the second initial uplink bandwidth part is the same as a starting physical resource block of the first initial uplink bandwidth part or a starting frequency domain position of the second initial uplink bandwidth part is the same as a starting frequency domain position of the first initial uplink bandwidth part;

wherein the first condition comprises at least one of the following:

a sum of a bandwidth of the random access channel resource and an offset of a starting physical resource block of the random access channel resource relative to the starting physical resource block of the first initial uplink bandwidth part is less than or equal to a maximum bandwidth configuration value corresponding to the first type of UE in an operating frequency band;

a sum of a bandwidth of the random access channel resource and an offset of a starting physical resource block of the random access channel resource relative to the starting physical resource block of the first initial uplink bandwidth part is less than or equal to the bandwidth of the second initial uplink bandwidth part;

a frequency domain bandwidth between an ending physical resource block of the random access channel resource and the starting physical resource block of the first initial uplink bandwidth part is less than or equal to a maximum bandwidth configuration value corresponding to the first type of UE in an operating frequency band; or a frequency domain bandwidth between an ending physical resource block of the random access channel resource and the starting physical resource block of the first initial uplink bandwidth part is less than or equal to the bandwidth of the second initial uplink bandwidth part;

wherein the offset of the starting physical resource block of the random access channel resource relative to the starting physical resource block of the first initial uplink bandwidth part is indicated by N1 physical resource blocks, wherein N1 is an integer greater than or equal to 0.

6. The method of claim 4, wherein in a case where a second condition is satisfied, an ending physical resource block in an ending resource block group of the second initial uplink bandwidth part is the same as an ending physical resource block of the first initial uplink bandwidth part or an ending frequency domain position of the second initial uplink bandwidth part is the same as an ending frequency domain position of the first initial uplink bandwidth part;

wherein the second condition comprises at least one of the following:

a sum of a bandwidth of the random access channel resource and an offset of an ending physical resource block of the random access channel resource relative to the ending physical resource block of the first initial uplink bandwidth part is less than or equal to a maximum bandwidth configuration value corresponding to the first type of UE in an operating frequency band;

a sum of a bandwidth of the random access channel resource and an offset of an ending physical resource block of the random access channel resource relative to the ending physical resource block of the first initial uplink bandwidth part is less than or equal to the bandwidth of the second initial uplink bandwidth part;

a frequency domain bandwidth between a starting physical resource block of the random access channel resource and the ending physical resource block of the first initial uplink bandwidth part is less than or equal to a maximum bandwidth configuration value corresponding to the first type of UE in an operating frequency band; or a frequency domain bandwidth between a starting physical resource block of the random access channel resource and the ending physical resource block of the first initial uplink bandwidth part is less than or equal to the bandwidth of the second initial uplink bandwidth part;

wherein the offset of the ending physical resource block of the random access channel resource relative to the ending physical resource block of the first initial uplink bandwidth part is indicated by N2 physical resource blocks, wherein N2 is an integer greater than or equal to 0.

7. The method of claim 1, wherein the random access channel resource comprises a first part of random access channel occasions and a second part of random access channel occasions;

wherein the second initial uplink bandwidth part comprises a first bandwidth part and a second bandwidth part, wherein the first bandwidth part comprises the first part of random access channel occasions in the random access channel resource, and the second bandwidth part comprises the second part of random access channel occasions in the random access channel resource.

8. The method of claim 7, wherein in a case where a third condition is satisfied, a starting physical resource block of the first bandwidth part is the same as a starting physical resource block of the first initial uplink bandwidth part or a starting frequency domain position of the first bandwidth part is the same as a starting frequency domain position of the first initial uplink bandwidth part;

wherein the third condition comprises at least one of the following:

a sum of a bandwidth of the first part of random access channel occasions and an offset of a starting physical resource block of the first part of random access channel occasions relative to the starting physical resource block of the first initial uplink bandwidth part is less than or equal to a maximum bandwidth configuration value corresponding to the first type of UE in an operating frequency band;

a sum of a bandwidth of the first part of random access channel occasions and an offset of a starting physical resource block of the first part of random access channel occasions relative to the starting physical resource block of the first initial uplink bandwidth part is less than or equal to the bandwidth of the second initial uplink bandwidth part;

a frequency domain bandwidth between a starting physical resource block of the first part of random access channel occasions and an ending physical resource block of the first initial uplink bandwidth part is less than or equal to a maximum bandwidth configuration value corresponding to the first type of UE in an operating frequency band; or a frequency domain bandwidth between a starting physical resource block of the first part of random access channel occasions and an ending physical resource block of the first initial uplink bandwidth part is less than or equal to the bandwidth of the second initial uplink bandwidth part;

wherein the offset of the starting physical resource block of the first part of random access channel occasions relative to the starting physical resource block of the first initial uplink bandwidth part is indicated by N3 physical resource blocks, wherein N3 is an integer greater than or equal to 0.

9. The method of claim 7, wherein in a case where a fourth condition is satisfied, an ending physical resource block of the second bandwidth part is the same as an ending physical resource block of the first initial uplink bandwidth part or an ending frequency domain position of the second bandwidth part is the same as an ending frequency domain position of the first initial uplink bandwidth part;

wherein the fourth condition comprises at least one of the following:

a sum of a bandwidth of the second part of random access channel occasions and an offset of an ending physical resource block of the second part of random access channel occasions relative to the ending physical resource block of the first initial uplink bandwidth part is less than or equal to a maximum bandwidth configuration value corresponding to the first type of UE in an operating frequency band;

a sum of a bandwidth of the second part of random access channel occasions and an offset of an ending physical resource block of the second part of random access channel occasions relative to the ending physical resource block of the first initial uplink bandwidth part is less than or equal to the bandwidth of the second initial uplink bandwidth part;

a frequency domain bandwidth between a starting physical resource block of the second part of random access channel occasions and the ending physical resource block of the first initial uplink bandwidth part is less than or equal to a maximum bandwidth configuration value corresponding to the first type of UE in an operating frequency band; or a frequency domain bandwidth between a starting physical resource block of the second part of random access channel occasions and the ending physical resource block of the first initial uplink bandwidth part is less than or equal to the bandwidth of the second initial uplink bandwidth part;

wherein the offset of the ending physical resource block of the second part of random access channel occasions relative to the ending physical resource block of the first initial uplink bandwidth part is indicated by N4 physical resource blocks, wherein N4 is an integer greater than or equal to 0.

10. The method of claim 7, wherein a bandwidth of the first bandwidth part is configured by a network side or is a maximum bandwidth configuration value corresponding to the first type of UE in an operating frequency band; and a bandwidth of the second bandwidth part is configured by the network side or is the maximum bandwidth configuration value corresponding to the first type of UE in the operating frequency band.

11. The method of claim 1, further comprising:

determining a frequency domain resource occupied by the second initial uplink bandwidth part according to at least one of:

a number of random access channel occasions in the random access channel resource;

a frequency domain bandwidth corresponding to the random access channel resource;

a starting frequency domain position of the random access channel resource;

an ending frequency domain position of the random access channel resource;

a starting frequency domain position of the first initial uplink bandwidth part;

an ending frequency domain position of the first initial uplink bandwidth part;

the bandwidth of the first initial uplink bandwidth part; or the bandwidth of the second initial uplink bandwidth part.

12. The method of claim 11, wherein in a case where a fifth condition is satisfied, a starting physical resource block or a starting resource block group of the second initial uplink bandwidth part is a starting physical resource block or a starting resource block group of the first initial uplink bandwidth part;

wherein the fifth condition comprises the following:

a frequency domain bandwidth between the ending frequency domain position of the random access channel resource and the starting frequency domain position of the first initial uplink bandwidth part is less than or equal to the bandwidth of the second initial uplink bandwidth part;

wherein in a case where a sixth condition is satisfied, an ending physical resource block or an ending resource block group of the second initial uplink bandwidth part is an ending physical resource block or an ending resource block group of the first initial uplink bandwidth part; and wherein the sixth condition comprises the following:

a frequency domain bandwidth between the starting frequency domain position of the random access channel resource and the ending frequency domain position of the first initial uplink bandwidth part is less than or equal to the bandwidth of the second initial uplink bandwidth part.

13. The method of claim 11, wherein in a case where a seventh condition is satisfied, a starting physical resource block or a starting resource block group of the second initial uplink bandwidth part is a physical resource block or a starting resource block group comprising the starting frequency domain position of the random access channel resource;

wherein the seventh condition comprises at least one of the following:

a frequency domain bandwidth between the ending frequency domain position of the random access channel resource and the starting frequency domain position of the first initial uplink bandwidth part is greater than the bandwidth of the second initial uplink bandwidth part; or a frequency domain bandwidth between the starting frequency domain position of the random access channel resource and the ending frequency domain position of the first initial uplink bandwidth part is greater than the bandwidth of the second initial uplink bandwidth part; or in a case where an eighth condition is satisfied, an ending physical resource block or a starting resource block group of the second initial uplink bandwidth part is a physical resource block or a starting resource block group comprising the ending frequency domain position of the random access channel resource;

wherein the eighth condition comprises at least one of the following:

a frequency domain bandwidth between the ending frequency domain position of the random access channel resource and the starting frequency domain position of the first initial uplink bandwidth part is greater than the bandwidth of the second initial uplink bandwidth part; or a frequency domain bandwidth between the starting frequency domain position of the random access channel resource and the ending frequency domain position of the first initial uplink bandwidth part is greater than the bandwidth of the second initial uplink bandwidth part.

14. The method of claim 11, wherein configuring the second initial uplink bandwidth part comprises:

in a case where the number of random access channel occasions in the random access channel resource is greater than or equal to a determined value T or in a case where the frequency domain bandwidth corresponding to the random access channel resource is greater than or equal to a determined value N, configuring two second initial uplink bandwidth parts.

15. The method of claim 14, wherein in a case where a ninth condition is satisfied, a starting physical resource block or a starting resource block group of one second initial uplink bandwidth part of the two second initial uplink bandwidth parts is a starting physical resource block or a starting resource block group of the first initial uplink bandwidth part;

wherein the ninth condition comprises the following:

a frequency domain bandwidth between a sum of frequency domain bandwidths corresponding to random access channel occasions whose indexes are less than or equal to a determined value D and the starting frequency domain position of the first initial uplink bandwidth part is less than or equal to the bandwidth of the second initial uplink bandwidth part.

16. The method of claim 14, wherein in a case where a tenth condition is satisfied, an ending physical resource block or an ending resource block group of one second initial uplink bandwidth part of the two second initial uplink bandwidth parts is an ending physical resource block or an ending resource block group of the first initial uplink bandwidth part;

wherein the tenth condition comprises the following:

a frequency domain bandwidth between a sum of frequency domain bandwidths corresponding to random access channel occasions whose indexes are greater than or equal to a determined value E and the ending frequency domain position of the first initial uplink bandwidth part is less than or equal to the bandwidth of the second initial uplink bandwidth part.

17. A non-transitory computer-readable storage medium, which is configured to store a computer program which, when executed by a processor, causes the processor to perform the bandwidth configuration method of claim 1.

18. A transmission method, comprising:

determining a second initial uplink bandwidth part, wherein a bandwidth of the second initial uplink bandwidth part is smaller than a bandwidth of a first initial uplink bandwidth part, the first initial uplink bandwidth part has a random access channel resource, the random access channel resource comprises at least one random access channel occasion, and the at least one random access channel occasion is used for transmitting a random access preamble; and transmitting the random access preamble through a frequency domain resource in the second initial uplink bandwidth part;

wherein a physical resource block of the random access channel resource corresponds to a first subcarrier spacing, and a physical resource block of the second initial uplink bandwidth part corresponds to a second subcarrier spacing, wherein in a case where the first subcarrier spacing is different from the second subcarrier spacing, a starting physical resource block of the second initial uplink bandwidth part is a physical resource block comprising a starting physical resource block of the random access channel resource and having the second subcarrier spacing.

19. A communication node, comprising: a memory, a processor, and a computer program stored on the memory and executable by the processor, wherein the processor executes the computer program to perform steps, wherein the step comprises:

determining a first initial uplink bandwidth part, wherein the first initial uplink bandwidth part has a random access channel resource, the random access channel resource comprises at least one random access channeloccasion, and the at least one random access channel occasion is used for transmitting a random access preamble; and configuring a second initial uplink bandwidth part for a first type of user equipment (UE), wherein a bandwidth of the second initial uplink bandwidth part is smaller than a bandwidth of the first initial uplink bandwidth part;

wherein the second initial uplink bandwidth part comprises the random access channel resource;

wherein a starting physical resource block of the second initial uplink bandwidth part is the same as a starting physical resource block of the random access channel resource; and wherein a physical resource block of the random access channel resource corresponds to a first subcarrier spacing, and a physical resource block of the second initial uplink bandwidth part corresponds to a second subcarrier spacing, wherein in a case where the first subcarrier spacing is different from the second subcarrier spacing, a starting physical resource block of the second initial uplink bandwidth part is a physical resource block comprising a starting physical resource block of the random access channel resource and having the second subcarrier spacing.

* * * * *